(12) United States Patent
Nesseth

(10) Patent No.: US 6,227,379 B1
(45) Date of Patent: May 8, 2001

(54) ROTARY SEPARATOR APPARATUS AND METHOD

(75) Inventor: Clinton A. Nesseth, Cameron, WI (US)

(73) Assignee: NTH, Inc., Barron, WI (US)

( * ) Notice: Subject to any disclaimer, the term of this patent is extended or adjusted under 35 U.S.C. 154(b) by 0 days.

(21) Appl. No.: 09/223,081

(22) Filed: Dec. 29, 1998

Related U.S. Application Data

(60) Continuation-in-part of application No. 08/763,972, filed on Dec. 10, 1996, now Pat. No. 5,853,585, which is a division of application No. 08/355,522, filed on Dec. 14, 1994, now Pat. No. 5,628,912.

(51) Int. Cl.⁷ .................................................. B01D 33/06
(52) U.S. Cl. ..................... 210/393; 210/391; 210/241; 210/394; 210/400; 210/402; 210/403; 210/408; 210/409; 209/270; 209/294; 209/299
(58) Field of Search .............................. 26/241, 393, 394, 26/391, 396, 400, 401, 402, 403, 404, 407, 408, 409; 209/268, 270, 294, 299

(56) References Cited

U.S. PATENT DOCUMENTS

| | | |
|---|---|---|
| 1,504,020 | 8/1924 | Brackett . |
| 1,712,258 | 5/1929 | Compain . |
| 1,920,158 | 7/1933 | Albertson . |
| 2,147,088 | 2/1939 | Carson . |
| 3,876,341 | 4/1975 | Nesseth . |
| 3,941,702 | 3/1976 | Kawada . |
| 3,971,720 | 7/1976 | Swanson et al. . |
| 3,982,499 | 9/1976 | Frankl . |
| 4,426,289 | 1/1984 | Svehaug . |
| 4,439,115 | 3/1984 | Nesseth et al. . |
| 4,477,349 | 10/1984 | Monteyne . |
| 4,518,498 | 5/1985 | Monteyne . |
| 4,623,449 | 11/1986 | Böhnensieker . |
| 4,652,374 | 3/1987 | Cohen . |
| 4,666,602 | 5/1987 | Hartzell . |
| 4,724,077 | 2/1988 | Uchiyama . |
| 4,830,746 | 5/1989 | Liabenow et al. . |
| 4,906,364 | 3/1990 | Luthi et al. . |
| 5,268,100 | 12/1993 | Hartzell . |
| 5,628,912 | 5/1997 | Nesseth . |
| 5,804,071 | * 9/1998 | Haeffner ............................... 210/394 |
| 5,853,585 | 12/1998 | Nesseth . |

FOREIGN PATENT DOCUMENTS

| | | |
|---|---|---|
| 0 383 527 | 8/1990 | (EP) . |
| 688265 | 3/1953 | (GB) . |

OTHER PUBLICATIONS

Flier from Mid–Atlantic Agrisystems of Oxford, Pennsylvania, entitled "Liquid Manure Separator for the 90's".

* cited by examiner

Primary Examiner—Robert Popovics
(74) Attorney, Agent, or Firm—Merchant & Gould P.C.

(57) ABSTRACT

A method and apparatus for efficiently separating solids from liquid/solid slurries are disclosed. The slurry to be separated is retainably placed within a container having one or more lift paddles secured within its inner cavity. The container is supported for rotation about an axis and has drive means for slowly rotating the container. As the container rotates, the lift paddles lift a portion of the retained slurry, allowing the liquid portion to fall back into the primary slurry pool to be separated, and lifting coarse solids toward the top of the rotation path of the paddles. The separated solids slide by gravity from the lift paddles as they approach the top of their rotation paths and into a collection tray. A filter that rotates with the container filters fine solids from the liquid portion of the slurry and also deposits the fine solids on the collection tray. The filtered liquids can be readily pumped from or recirculated to the separator. The collection tray reciprocates about a longitudinal axis to move the collected solids from the separator, collection or transport. Continuous flow-through and multiple chamber separation containers are disclosed.

25 Claims, 10 Drawing Sheets

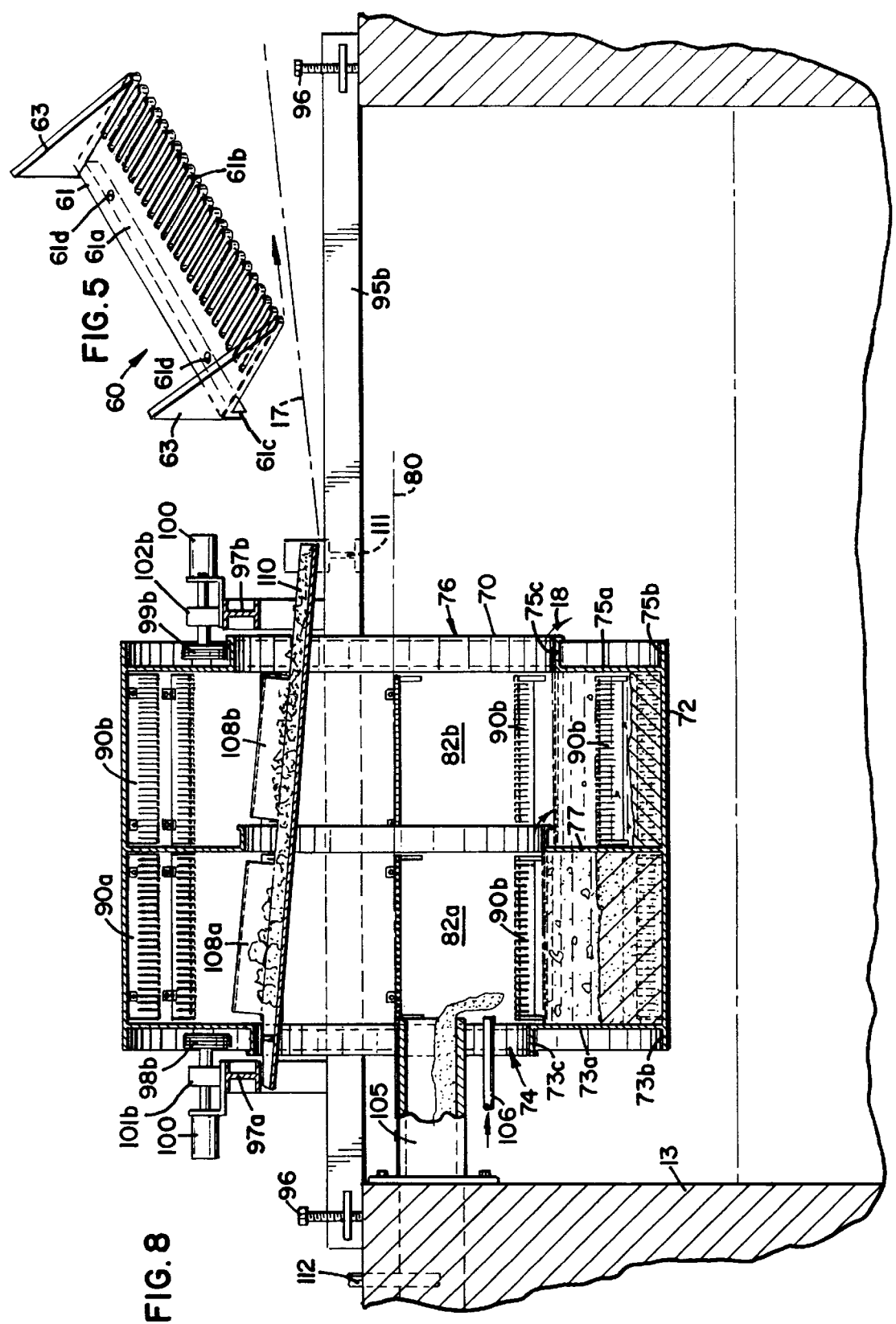

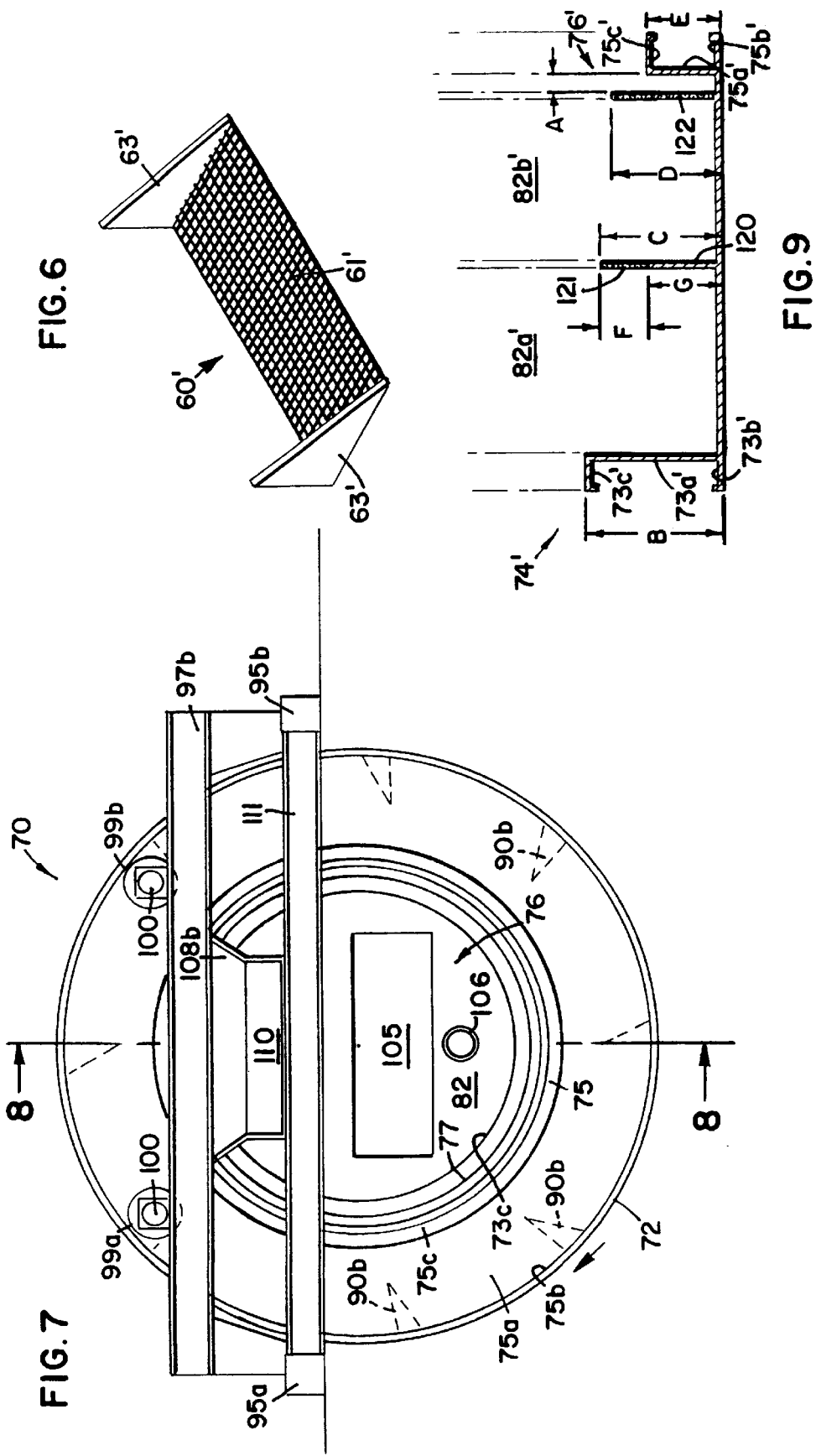

ROTARY SEPARATOR APPARATUS AND METHOD

CROSS-REFERENCE TO RELATED APPLICATIONS

This is a Continuation-in-part of application Ser. No. 08/763,972 filed on Dec. 10, 1996, now U.S. Pat. No. 5,853,585, which is a Divisional of application Ser. No. 08/355,522 filed on Dec. 14, 1994, now U.S. Pat. No. 5,628,912.

FIELD OF THE INVENTION

This invention relates generally to the separation of solids from slurries, and more particularly to a rotary separator for separating solids from animal waste slurries.

BACKGROUND OF THE INVENTION

There are many applications wherein it is desirable to separate solids from liquid/solid slurries, either for the purposes of reclaiming or recycling the separated components of the slurry, or for enabling more efficient handling or processing of the separated or "processed" components. One application, for example, is the separation of sand or particulate or granular materials from slurries of such materials. In such application, the primary purpose would be to reclaim the particulate sand from the slurry. Another application which is specifically addressed by the preferred embodiment of this specification is the removal of solids from animal waste slurries. Such processing of animal waste slurries not only allows for more efficient disposal of the removed solids, but also enables the remaining liquid and/or slurry material to be effectively and efficiently pumped for further direct use or processing.

Animal waste or manure is typically collected in a barn or other animal housing structure through slotted floors or in collection troughs or the like, and is moved either manually or by automated means toward collection reservoirs or pits. The consistency of such waste slurries includes organic solid wastes, fibrous materials such as bedding hay or the like, sand and liquids. It has been found that an optimum consistency of such waste slurries for pumping by impeller-type pumps are those that contain on the order of 5–6% solids. Such compositions can be more easily pumped and processed, with smaller, lower powered pumps and agitators. Alternatively, higher powered pumps can perform with greater efficiency. Further, it is desirable to remove as much abrasive material such as sand, and fibrous material such as hay and bedding material from the slurry prior to pumping.

In colder climates wherein the animal waste may be forced by piston pumps through underground conduits to remote storage reservoirs (as for example described in my prior U.S. Pat. Nos. 3,876,341 and 4,439,115) it is also desirable to preprocess such animal waste slurries prior to pumping by the piston pumps in order to facilitate operation of the pumps and to remove most of the fibrous material from the slurry which is a significant cause of blockage within the underground transport conduits, and which can cause the various movable valve portions of such pumping systems to hang-up or bind. Such blockages or valve malfunctions can result in costly, potentially dangerous system cleaning and/or repair operations and pressurized gas buildup in the underground lines.

One technique for simply reducing the percentage of solids in a slurry (as for example, to get down to the desired 5–6% solids figure) is to simply add water or other liquid to the slurry until the desired consistency is attained. This technique is generally unsatisfactory since it greatly increases the volume of materials requiring pumping and disposal or storage. Further, such technique does not address the problem of removal of undesirable solids such as sand or fibrous material from the slurry prior to pumping.

The best solution, therefore, is to physically remove unwanted solids from the slurry prior to pumping and/or further processing of the slurry. To date, however, known techniques for removing solids from slurries such as animal waste slurries have not been particularly efficient or flexible in use. The most commonly used such system is configured in the form of a screen-like surface engaged by a plurality of conveyor-like moving metal paddles that push the waste material along and over the screen or grid surface such as illustrated in U.S. Pat. Nos. 4,666,602 or 5,268,100. The theory of operation of such systems is that the liquid portion of the slurry will pass through the porous screen surface for collection below the screen, and the solids will be pushed along over the screen surface and collected at one end. Such apparatus is highly susceptible to wear and requires significant maintenance due to constant sliding engagement between the metal screen and conveyor blade members. Further, a portion of the solids tend to be "squeezed" through the screen by the sliding blades and back into the collected liquid portion where they have a tendency to resolidify. In addition, fibrous materials such as hay and straw have a tendency to stick or catch in the screen, causing potential binding and/or inefficiency of operation.

Others have used rotary drum-shaped screen filters for filtering solids from slurry materials. An example of such apparatus is illustrated in U.S. Pat. No. 4,426,289. The slurry is introduced to the interior of a screen-type drum filter and is pushed along the interior surface of the drum as it rotates while the liquids pass through the mesh surface of the drum. Other rotary drum filter structures, such as those used in roll press applications, pass slurry over the external surface of a rotary drum screen filter through which the liquid passes. A press roll can be used in association with the filter drum to squeeze the slurry material between the press roll and the underlying drum filter to further extract liquids from the solids. As with the conveyor-type structures, these known rotary separators use simple filtration for performing the solids separation from the slurry, but also generally require frictional engagement between the filtration screen mechanism and another structure to advance the filtered solids. Also, such filtration structures do not generally reuse the filtered liquid to assist in washing of slurry material that is yet to be separated.

A system that lifts solids from a slurry in a flow-through sewage system is shown in U.S. Pat. No. 1,920,158. Such system uses a bucket conveyor to scrape solids from a filtering screen and to lift solids from a slurry to a discharge chute. The system suffers from its use of moving conveyor parts that are inherently susceptible to failure in the raw sewage environment in which they work, and from wearing frictional engagement of the buckets with the filtration screen and collection pit from which the buckets scrape their solids.

The present invention addresses the needs and shortcomings of prior art separators and separation techniques. In my earlier U.S. Pat. No. 5,628,912 and patent application Ser. No. 08/763,972 (to issue as U.S. Pat. No. 5,853,585), I disclosed a simple and effective method and apparatus for separating solids from slurries in a highly efficient and reliable manner and with apparatus that takes a minimum of physical space, and is highly reliable, uses a minimum of movable parts and which is readily adaptable for use with a large variety of slurry materials and in a number of different applications. This invention when combined with those of my prior patents provides for even more effective filtration of the processed slurry, by removing additional finer solids from the processed slurry liquid, just prior to it being pumped. This invention also provides for an improved apparatus and method for moving the separated solids from the separator apparatus to an external deposition location, without the need for standard conveyor belt configurations that are unreliable in the highly corrosive environments in which this invention may be used.

SUMMARY

This invention provides a simple and efficient method and apparatus for separating solids from any type of liquid/solid slurry. While the invention is particularly useful in agricultural applications for processing animal wastes, the principles of the invention apply to other applications as well, such as, for example, separating sand from liquid/sand slurries and for moving materials independent of a separator function. Applicability of the principles of this invention will be limited only by the imaginations of those skilled in the art.

The invention separates solids from a slurry by rotating the slurry within one or more primary separation container (s) having one or more fixed lift paddles mounted in the container and rotatable therewith. Slurry to be separated may be processed on either a batch or continuous feed basis. The slurry to be separated is normally retained near the bottom of the container. As the container rotates, each paddle passing through the retained slurry lifts a portion of the slurry from the bottom of the container and removes solids from the lifted slurry as the paddle rotates with the container. As the paddle traverses its rotation path as defined by the container, liquids from the lifted slurry flow back into the retained slurry at the bottom of the container, and the solids carried by the paddle simply slide off of the paddle and into a collection hopper as the paddle moves along the top of its rotation path. Unlike prior separation techniques that depend only upon filtration techniques, the liquids that are separated from the lifted slurry portion flow back into the primary slurry volume being held in the bottom of the container, to further dilute the slurry and to assist in washing the slurry for enhancing separation of the solids therefrom. This is particularly advantageous in agricultural applications for the invention, wherein the slurry being separated is animal waste. Such animal waste slurries contain a sticky mucous material that has a tendency to cause the slurry to bind together and resist separation. When enough liquid is present in the slurry, the mucous material separates from the solids, thus enhancing the separation process. The lift paddles can be fixedly secured to the inside of the container and rotate with the container, thereby enabling a system with no relative moving or slidable mechanical parts that are exposed to the slurry—thus providing for high reliability and low upkeep.

As described in my prior patents, the lift paddles may assume a number of varied configurations, and preferably contain a comb-like portion for enhancing a raking operation of the slurry to remove fibrous materials therefrom. Alternatively, the paddle could be constructed of screen-like material. The container can also assume a variety of shapes, but is preferably of cylindrical or drum-shaped configuration and rotatable about a longitudinal axis. The container can be supported from one side only, as for example, in cantilevered manner, or can be supported from both ends or from below in a manner such that the means supporting and rotating the container are isolated from the slurry material being processed. The principles of the invention also enable construction of a multi-stage rotatable separator wherein coarse or larger solids are removed during an initial separation stage, and successively finer solids are removed during successive stages. The improvements of this invention are particularly applicable to a flow-through separation container(s) wherein slurry material to be processed is continuously introduced to one end of the separating chamber, and processed slurry and removed solids exit from the opposite end of the separation chamber. According to one aspect of this invention the liquid portion of the slurry which has been processed by the primary separation container(s) to remove the larger solids therefrom is filtered to remove finer particles just prior to being pumped, either for reuse in the primary separation container, or to storage, or for other uses. Thus, according to one embodiment of the invention, there is provided a method of progressively separating solids from a slurry in a rotatable separator having coaxially aligned first and second separation chambers comprising the steps of:

(a) introducing a volume of slurry to be separated into a first separation chamber of said separator, having a solid external wall;

(b) removing, by rotation of said first chamber, coarse solids from said slurry in the first chamber, thereby creating a first processed slurry in said first chamber;

(c) causing said first processed slurry to progress to a second separation chamber of the separator;

(d) filtering, by rotation of said second chamber, fine solids from said first processed slurry in said second chamber, thereby creating a filtered liquid; and (e) collecting said removed coarse and said filtered fine solids.

According to another aspect of the invention the method comprises rotationally lifting the coarse solids and fine solids respectively from the slurry and the processed slurry. The method preferably includes the step of rotating the first and second chambers about a common axis and at the same rotational speed. The method further preferably includes the step of moving the collected coarse and fine solids by gravity along a reciprocating collection tray.

According to a further aspect of the invention there is provided a method of:

(a) introducing a flow of said slurry to be separated into a container;

(b) rotating said container about an axis;

(c) lifting coarse solids from said slurry as said container rotates;

(d) removing said lifted solids;

(e) removing a portion of the slurry containing fine solids and liquids from the container as it rotates;

(f) filtering said removed slurry portion to remove said fine solids therefrom and to produce a filtered liquid; and (g) recovering said filtered liquid.

According to yet a further aspect of the invention there is provided a method of moving (a) providing a collection tray with a supporting surface;

(b) longitudinally inclining the supporting surface;

(c) placing materials to be moved on said supporting surface;

(d) moving the supporting surface in reciprocating motion about an axis longitudinally extending below the support surface; wherein said materials on said support surface move from side to side and longitudinally along the support surface during said reciprocating motion.

The above method further preferably includes the step of removing liquids from the material during the reciprocating motion, preferably through the side-walls of the tray. The method further includes the step of reciprocating the support surface through angles of less than about 50° relative to each half reciprocatory cycle and preferably between angles of from about 40° to 50°.

According to yet a further aspect of the invention there is provided a separator apparatus for separating solids (a) a container having a solid outer wall portion defining a first inner cavity suitable for retainably holding a predetermined volume of slurry and a porous outer wall portion defining a second inner cavity contiguous with said first inner cavity; said porous outer wall being configured to filter fine solids from liquids carrying fine solids;

(b) a support connected with said container for rotatably supporting said container for rotation about an axis;

(c) at least one partially porous lift paddle mounted to said container within said first inner cavity and rotatable with said container along a closed arcuate path, said lift paddle being arranged and configured to engage and lift solids from the volume of slurry within said first inner cavity as said container rotates about said axis in a first direction;

(d) a partition separating said first and said second inner cavities, said partition being sized and configured to enable liquid with fine solids to pass from said slurry into said second inner cavity as new slurry is added to the volume of slurry within said first inner cavity;

(e) a collector extending into said first and said second inner cavities and disposed to at least partially underlie said lift paddle as it rotates in said first direction toward an apex of said arcuate path and to underlie an upper portion of said porous wall as it rotates in said first direction; and (f) a drive connected with said container for rotating said container about said axis in said first direction; whereby said lift paddle lifts and deposits coarse solids from said slurry onto said collector and whereby said porous outer wall removes and deposits fine solids from said slurry onto said collector.

The filtered liquids passing through the porous outer wall are collected by a liquid collector which may include a pump for disposing of the collected liquids and for recirculating a portion of the collected liquid back to the first inner cavity. The apparatus also preferably includes an impactor apparatus for assisting and dislodging fine solids from the rotating porous wall, and may also include liquid spray nozzles configured to clean the pores of the wall as the container rotates. The invention also includes a collector in the nature of an elongate tray longitudinally extending through the container and including a reciprocator drive for reciprocating the tray about a longitudinal axis for advancing the collected solids along the tray and out of the separator.

According to yet a further aspect of the invention there is provided a reciprocal conveyor (a) an elongate bottom panel extending from a first end to a discharge end;

(b) oppositely disposed side walls continuously extending upward from said bottom panel;

(c) as least two pivot bearings longitudinally spaced along an axis disposed beneath the bottom panel for pivotally supporting said bottom panel for reciprocal rotational motion about said axis;

(d) supports for said pivot bearings configured to support said reciprocal conveyor above the ground in a manner such that said first end is disposed relatively higher than said discharge end; and (e) a drive connected to said conveyor for reciprocally moving said bottom panel and side walls between first and second arcuate positions about said longitudinal axis; whereby materials carried by said tray progressively longitudinally move along said bottom panel and toward said discharge end as the conveyor reciprocates.

While the invention will be described in association with its application to separating animal wastes, it will be understood that the invention is not to be limited to such application. Further, while the invention will be described with respect to separation containers having defined shapes, and in particular with respect to a cylindrical drum-shaped container, the invention is not to be limited by the particular configuration of the separation chambers described with respect to the preferred embodiments of the invention.

Further, while lift paddles of the preferred embodiments will be described with respect to particular preferred configurations and as constructed from preferred materials, the invention is not to be limited by such configurations or materials. Similarly, while the preferred embodiments of the invention will describe particular modes of supporting the separation container and with regard to particular types of rotary drive devices, such support methods and drive structures are not intended to be limiting in any way. Further, while a preferred embodiment of the invention will be described with respect to a particular mechanical configuration for imparting impact forces to the filtration member for dislodging fine solids therefrom, the scope of the invention is not to be limited to the specific embodiment(s) described. The preferred embodiments of the invention will also describe particular transport means for removing the separated solids from the rotary container. No limitations to the invention are to be implied by such descriptions. Similarly, while the principles of multiple separating stages will be described with regard to a preferred two-stage separating chamber, the multiple separation stage principles of the invention are not to be limited in any way by such description. It will be understood that the principles of this invention can be applied to any number of separation stages. These and other aspects of the invention will become apparent to those skilled in the art upon the following more detailed description of preferred embodiments which incorporate the basic principles of this invention.

BRIEF DESCRIPTION OF THE DRAWING

Referring to the Drawing wherein like numerals represent like parts throughout the several views:

FIG. 5 is an enlarged view of a first embodiment of the lift paddle portion of the separator apparatus of FIGS. 2–4, illustrating a comb-like structure used therewith;

FIG. 6 is an enlarged view of a second embodiment of the lift paddle portion of the separator apparatus of FIGS. 2–4, illustrating a screen-like paddle configuration;

FIG. 7 is an end elevational view of a second embodiment of a separator apparatus of FIG. 1 as viewing the discharge end of the separator, illustrating a continuous flow-through design with multiple separation chambers;

FIG. 8 is a cross-sectional view of the separator apparatus of FIG. 7 generally taken along the Line 8—8 of FIG. 7;

FIG. 9 is a partial diagrammatic cross-sectional view of the lower internal wall and divider portions of an alternate configuration thereof, for a separator of the type illustrated in FIG. 7;

DETAILED DESCRIPTION OF THE INVENTION

Figure 1:
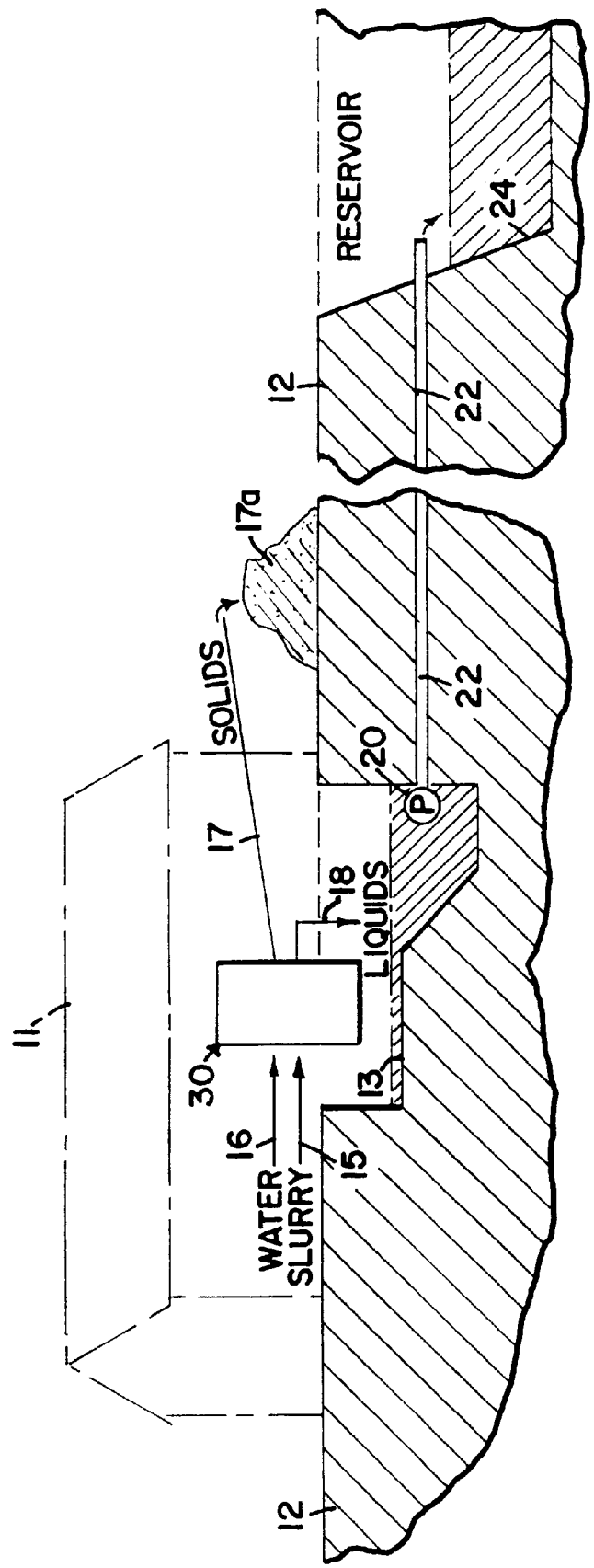
FIG. 1 is a diagrammatic view of a separator apparatus of the present invention illustrated in an environmental setting in which it might typically be used for removing solids from animal waste slurries.

Referring to the Drawing, there is generally illustrated in FIG. 1, a diagrammatic representation of a separator apparatus 30 for separating solids from slurry materials, indicated as it might appear when used in a typical agricultural setting for separating solids from animal waste slurries. As illustrated in FIG. 1, the separator 30 is mounted within a barn 11 or other structural building 11 either above or slightly below the ground or foundation level 12 of the structure, as will be hereinafter described in more detail. The barn or structure 11 is configured to define a relatively small collection pit or reservoir 13 that is typically arranged to immediately collect and hold animal waste produced in the barn 11. Such animal waste may typically be collected throughout the barn or structure by means of a plurality of trough structures (not shown) which flow by gravity into the collection reservoir 13, or which are periodically cleaned by automated trough cleaning apparatus in a manner well-known in the art. Alternatively, the barn or structure 11 may be of the type which has slotted floor panels through which the animal waste passes and is guided toward and collected by the collection reservoir below the floor. The waste materials deposited within the collection pit or reservoir 13 typically include not only organic animal waste, but also sand and fibrous material such as straw or bedding hay, and generally have the consistency of a slurry (i.e., solids mixed with liquids).

In the environment illustrated in FIG. 1, the separator apparatus 30 of this invention is configured to intercept the generated waste materials 15 prior to deposit thereof into the building's collection pit 13. The separator apparatus 30 is also configured to receive a source of water or other liquid facilitator (generally illustrated at 16) which is used to facilitate the separation process within the separator, as hereinafter described in more detail.

The separator apparatus 30 acts to remove solids 17 from the slurry and liquid mixture deposited in the separator, which solids are transported to a solids collection pile 17a which is typically located external of the structure 11, by appropriate transport means, as hereinafter described in more detail. Excess liquids (generally designated at 18) and/or processed slurry overflows from the separator apparatus 30 and into the collection pit or reservoir 13 within the structure. The processed slurry 18 is then conveyed, typically by means of a pump 20 and an appropriate conduit, generally illustrated at 22, either above or below ground level and to a remote location. A larger storage reservoir such as indicated at 24 in FIG. 1 could be located at the remote location to collect the processed slurry and pumped liquids. Alternatively, the pumped materials could be deposited in tanker containers or the like for subsequent distribution, or could be directly deposited through appropriate spray means to a field or the like—all in manners well-known in the art. The length of conduit 22 typically extends anywhere from several hundred feet to several miles in length. The pump, diagrammatically illustrated at 20, could represent either an impeller-type pump, or a piston-type pump as, for example, illustrated in my prior U.S. Pat. Nos. 3,876,341 or 4,439,115, hereby incorporated by reference to the extent that a more complete understanding of the background of this invention is desired.

It will be understood by those skilled in the art, that the particular use application illustrated in FIG. 1 for the separator apparatus is not unique, and that such separator can be used in any situation requiring a separation of solids from a slurry containing both liquids and solids. For example, the principles of the invention would apply simply to the separation of sand from a sand/liquid slurry as well. Even in agricultural applications, the separator apparatus and principles of this invention are not limited to use situations wherein the separator overlies a collection pit or reservoir within a building or structure, but could be applied in any situation wherein it may be desirable to reduce the solids contents of a slurry as for example, prior to pumping of the slurry from a remotely located reservoir such as at 24 in FIG. 1. The primary advantage of this invention is that the separation process is performed by a simple rotary movement of a separating drum, and does not require movement of separating structures relative to one another or any relative sliding of moving parts which would be susceptible to wear, clogging, maintenance and operative failure. With the present invention, the solids separation is simply performed by lifting the solids out of a collected slurry by simple rotary motion, by allowing excess liquid to drain out of the lifted solids for reuse in washing the slurry yet to be separated, and to deposit the collected and drained solids under the simple force of gravity into a collection hopper for transport to a remote location.

As described in my prior U.S. Pat. Nos. 5,628,912 and 5,853,585, a first embodiment illustrating a separating apparatus and method of this invention is illustrated in FIGS. 2 through 6. Referring thereto, the separating apparatus is generally illustrated at 30. The separator has, in the preferred embodiment, a rotatable cylindrical drum member 32 having a back side closed by a circular back plate 32a and a front side having an annular front plate 32b defining a circular inlet/outlet port 33 to the inner cavity 35 of the drum. The drum 32 is symmetrically configured for rotation about a central axis 40. The front plate 32b of the drum 32 has a forwardly extending cylindrical collar portion 32c coaxially aligned with axis 40 and terminating at an outer lip portion 32d. A spindle or axle member 36 is axially aligned with the axis 40 and is secured to a mounting bracket 37 by means of a hub assembly 38. The mounting bracket assembly 37 includes a plurality of channel iron stringer brace arms 37a which are secured to the back plate 32a and extend generally radially outward from the center of the back plate. The combination of the mounting bracket assembly 37, the hub assembly 38 and the spindle axle 36 physically support the weight of the drum 32 and its contents for rotation about the central axis 40. In the preferred embodiment, the spindle 36 is a 3-inch diameter spindle. The drum may be provided with one or more drain plugs, generally illustrated at 34.

Figure 2:
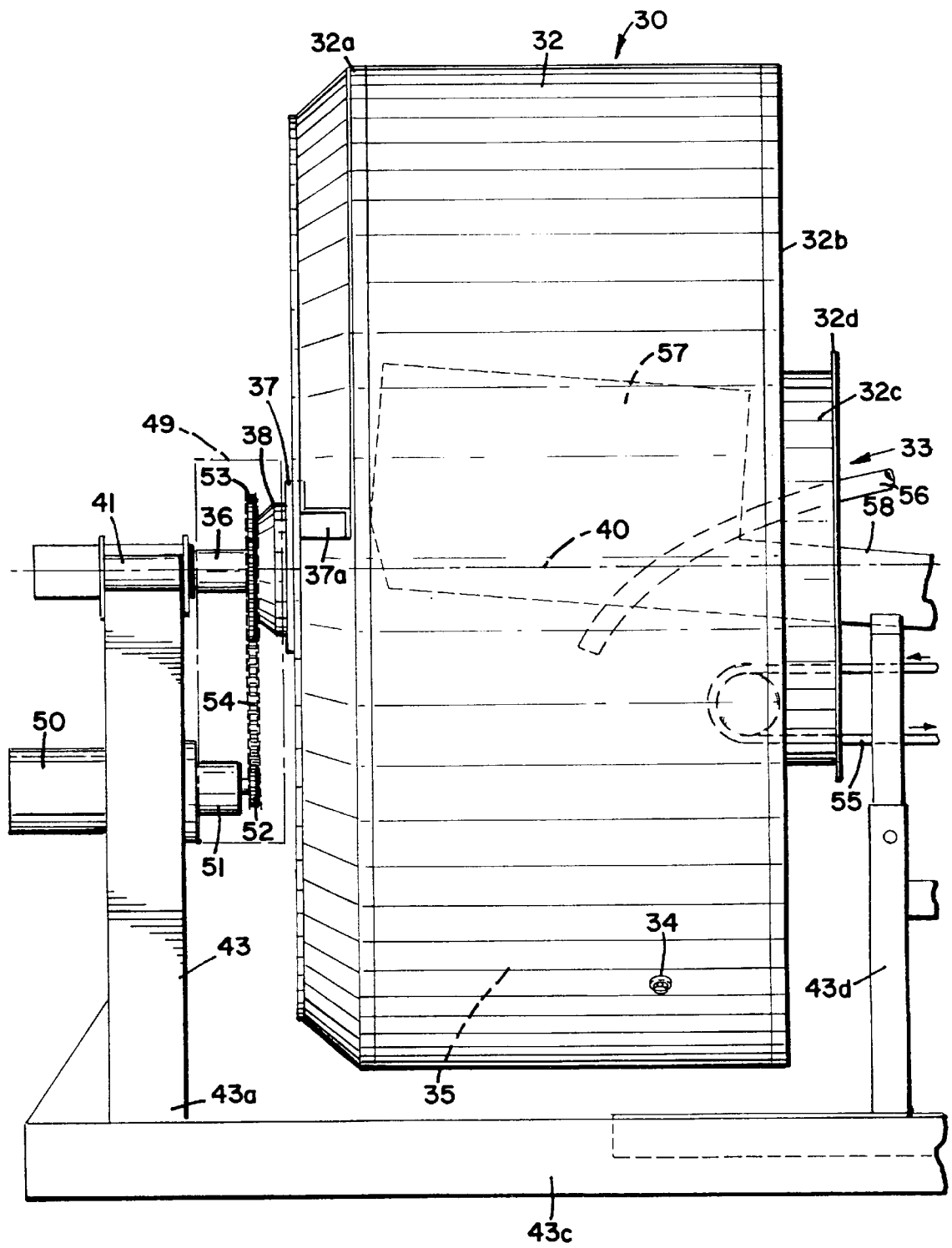
FIG. 2 is a view in side elevation of a first embodiment of the separator apparatus of FIG. 1.
Figure 3:
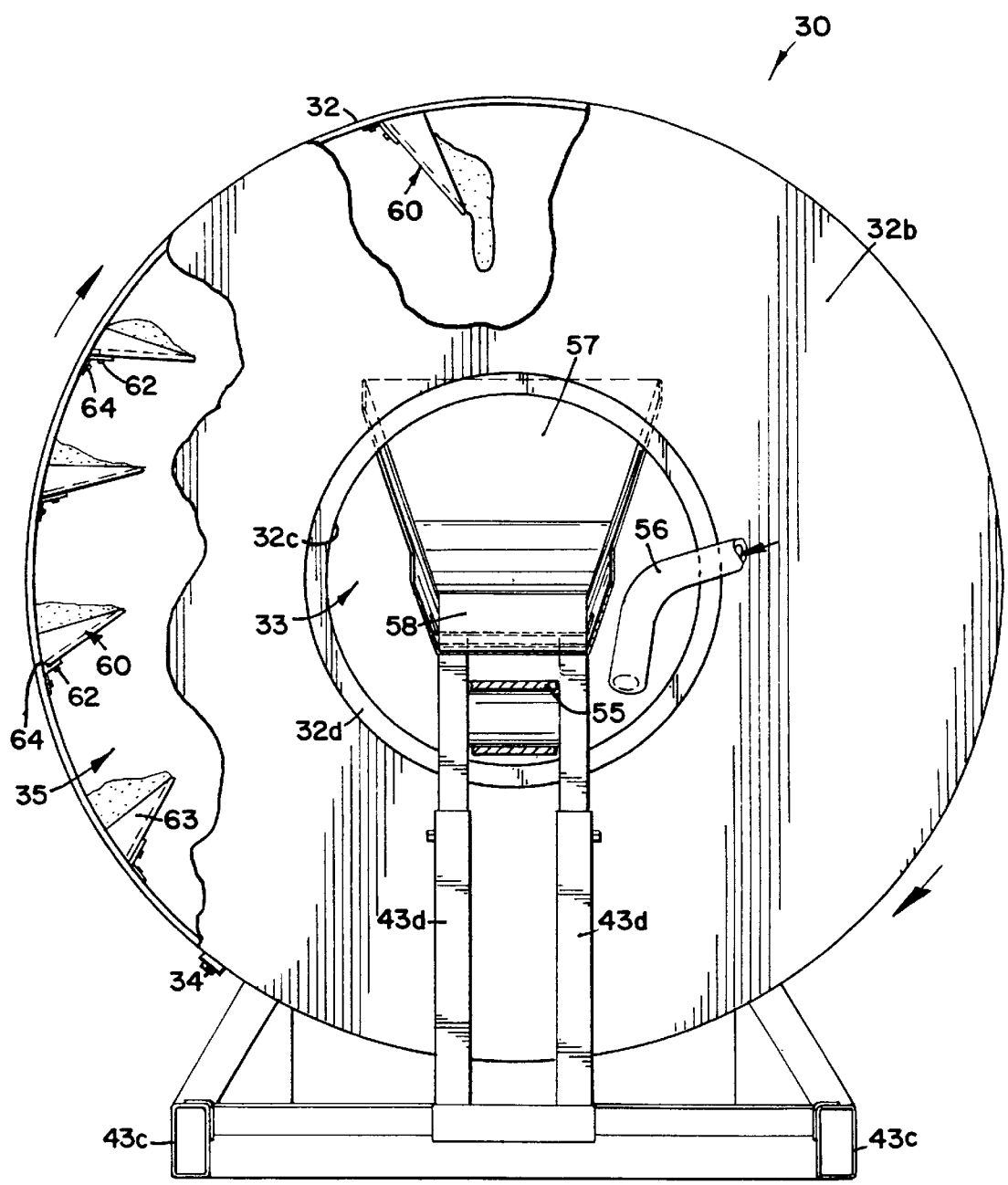
FIG. 3 is a front elevational view of the separator apparatus of FIG. 2, with portions thereof broken away.
Figure 4:
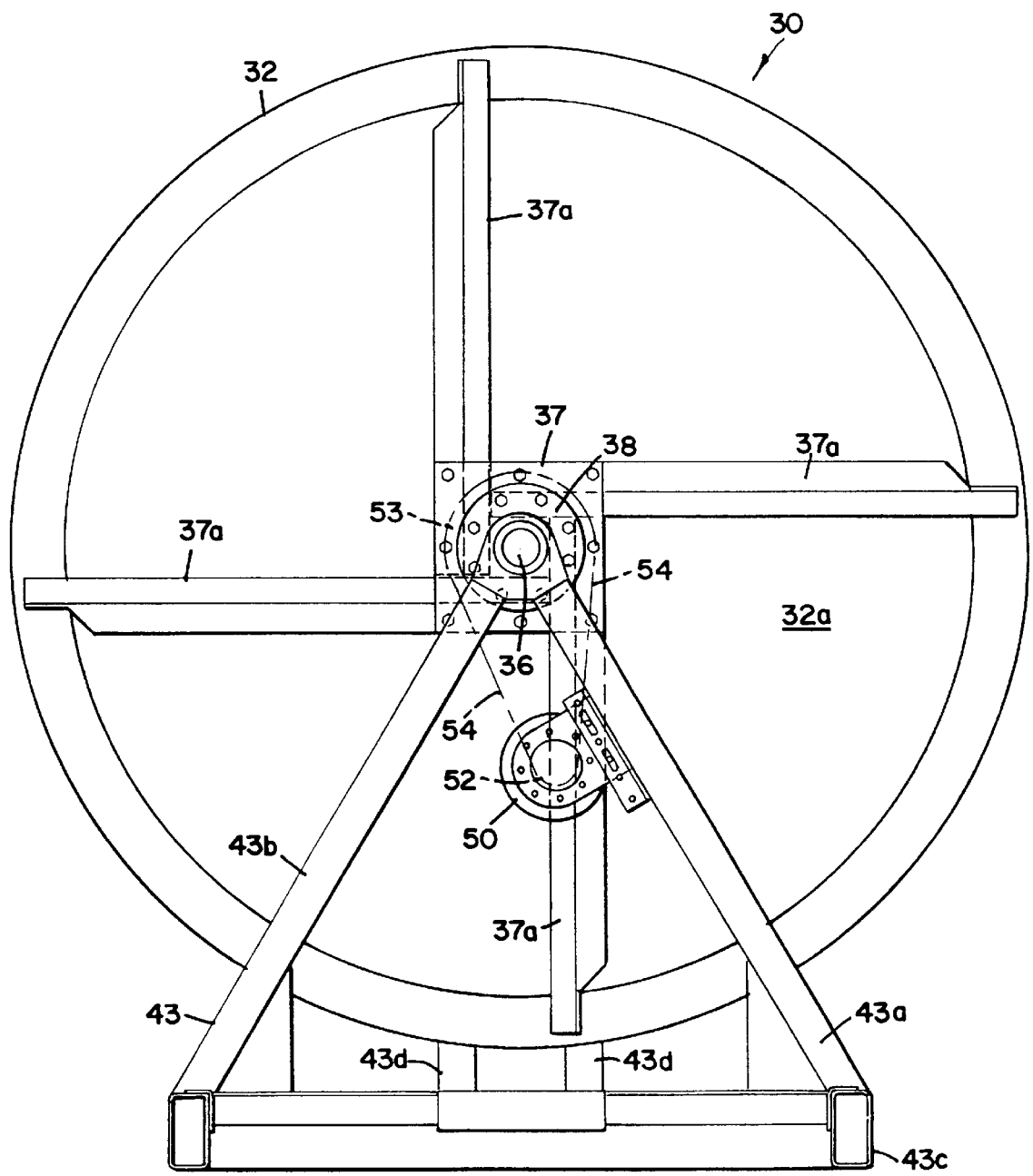
FIG. 4 is a back elevational view of the separator apparatus of FIGS. 2 and 3.
Figure 10:
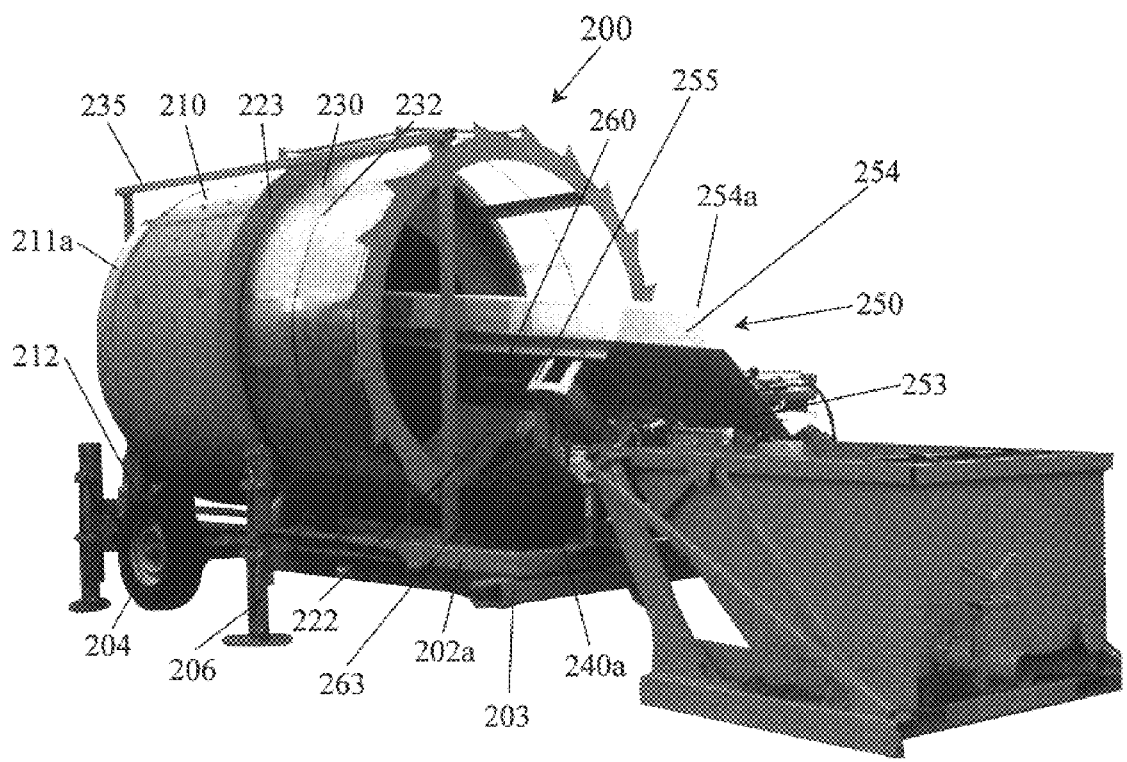
FIG. 10 is a perspective view of a third embodiment of a separator apparatus that includes a rotatable output screen filter section.
Figure 11:
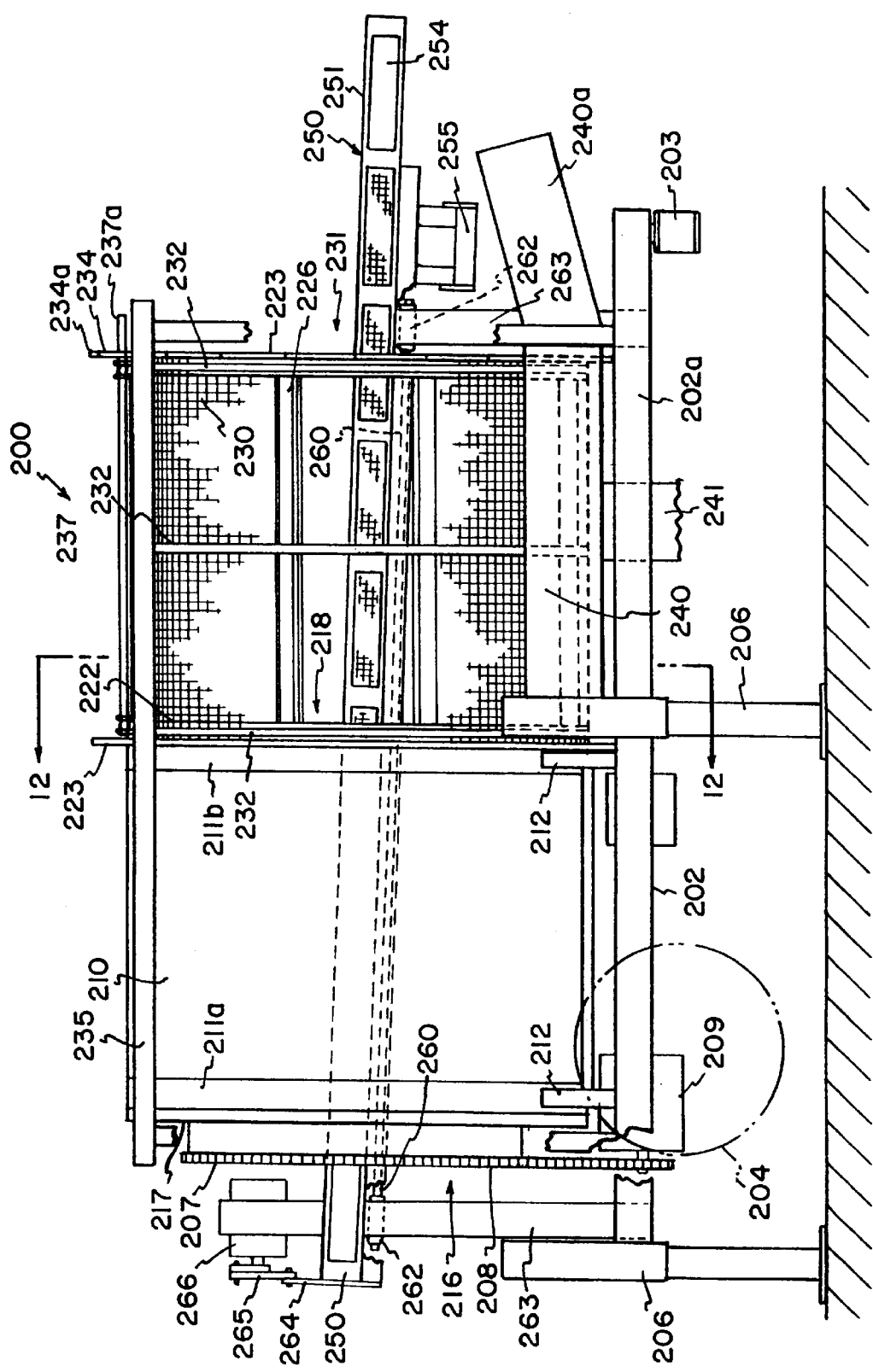
FIG. 11 is a side elevation view of the separator apparatus of FIG. 10, with portions thereof broken away.
Figure 12:
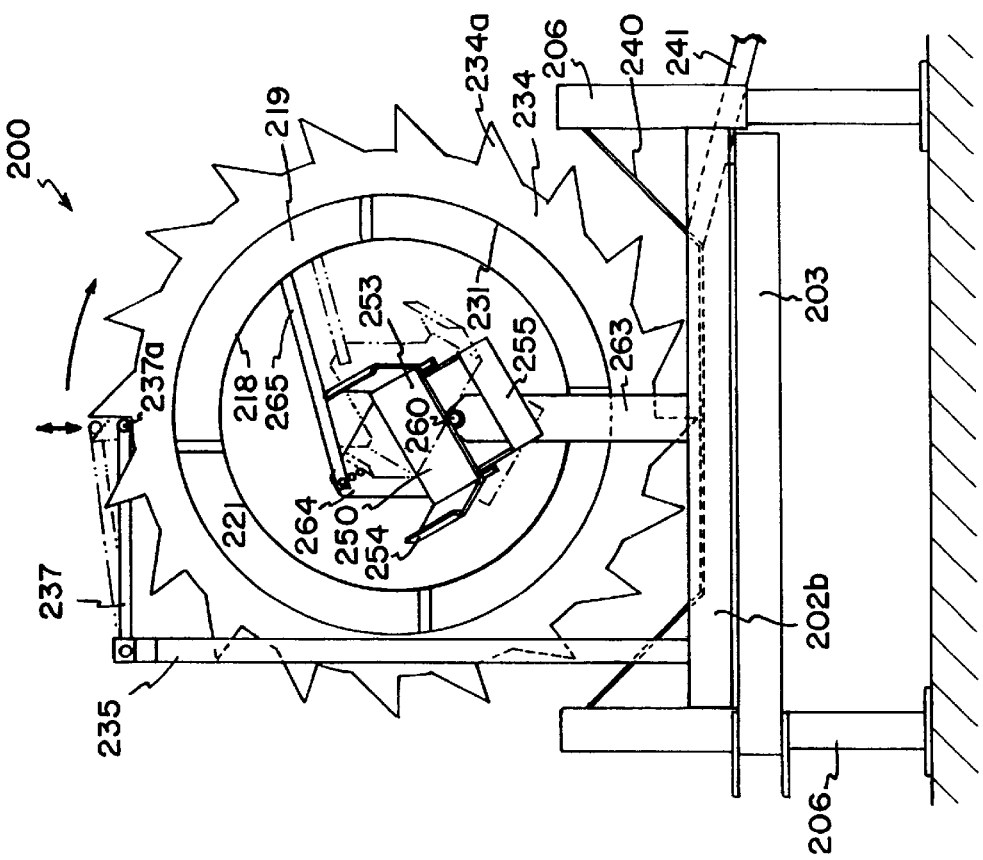
FIG. 12 is a view of the separator of FIG. 11, generally taken along the line 12—12 of FIG. 11 and illustrated without the solids collection conveyor apparatus.
Figure 13:
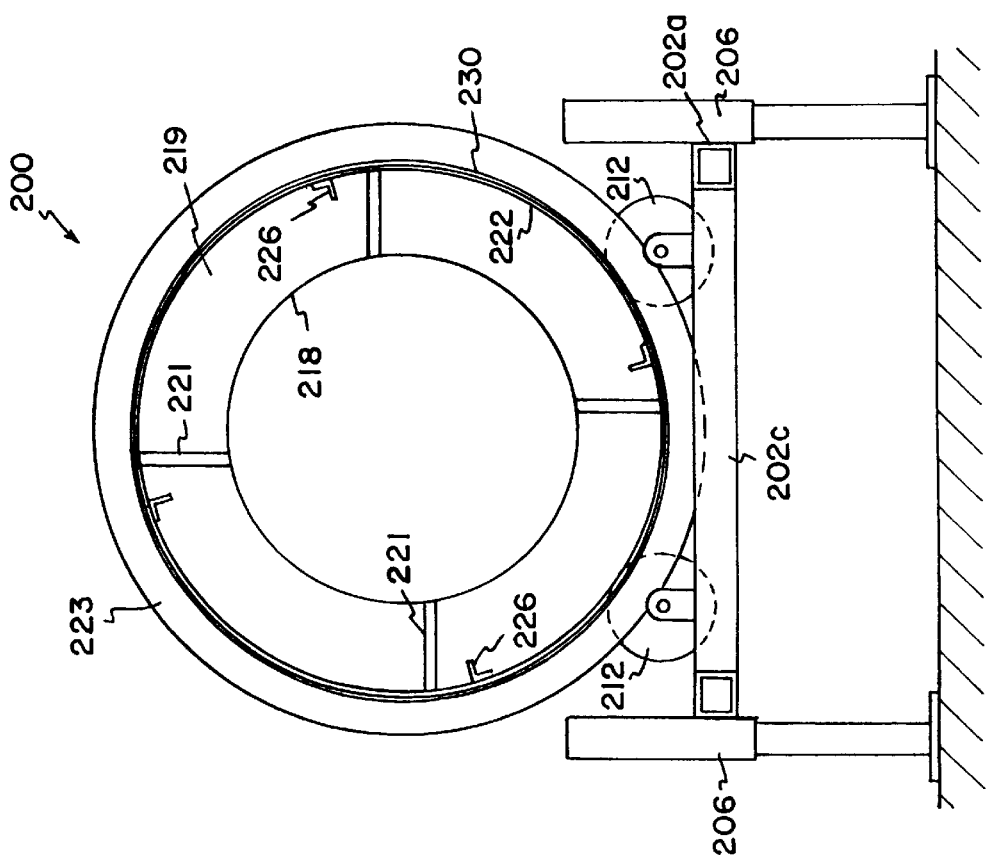
FIG. 13 is a front elevation view of the separator of FIG. 11 illustrated for clarity with certain parts removed.
Figure 14:
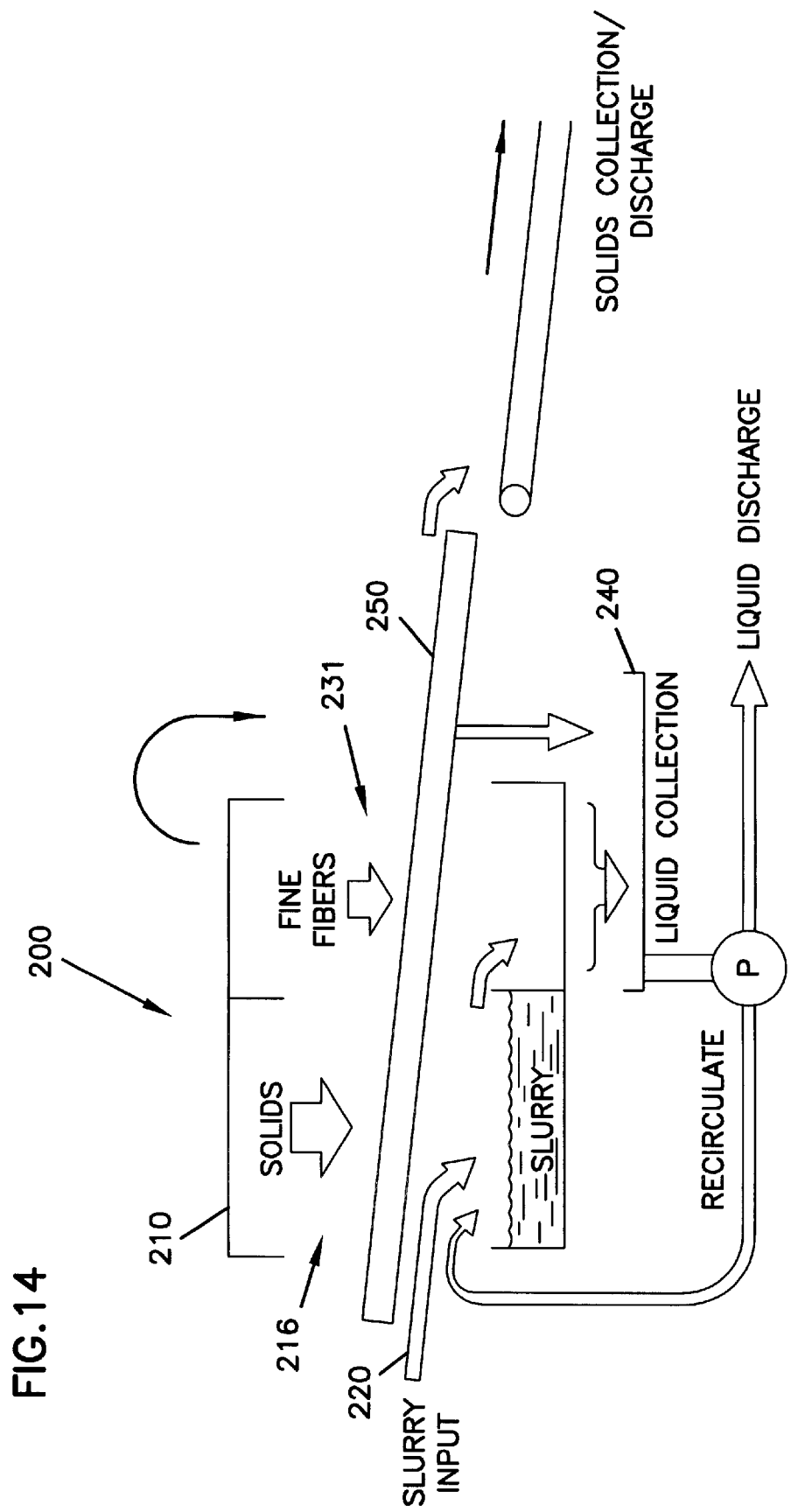
FIG. 14 is a diagrammatic view of the separator apparatus of FIG. 10, illustrating the flow of materials therethrough.

The spindle 36 is operatively journaled for rotation within and is supported by a bearing assembly 41 carried by a pair of upper arm members 43a and 43b of a support frame 43. The upper frame members 43a and 43b are secured at their lower ends to a generally horizontally disposed lower frame assembly designated at 43c which in the embodiment illustrated in FIG. 2–4, is configured to directly lie upon and rotatably support the drum assembly on a floor or other flat support surface. Alternatively, if it is desired for the separating apparatus to be mobile, the lower frame assembly could be supported by a wheel and axle assembly, in manner well known in the art, such that the entire separating apparatus could be moved in trailer fashion between desired locations. In the embodiment illustrated, the lower support members 43c extend from their points of securement with the upper frame members 43a and 43b, forwardly of the drum, and operatively support a plurality of generally vertically extending support members 43d which are adjustable in height (as hereinafter described) to support a conveyor or vibrating tray assembly. The support frame 43 rotatably supports the drum assembly 32 on the floor or other support surface such that the axis of rotation 40 of the drum is aligned in a generally horizontal manner. It will be appreciated that while the support frame 43 depicted with reference to the first embodiment of the invention is illustrated as supporting the rotatable drum 32 upon a flat surface, the particular configuration of such support frame is not intended to limit the invention in any way. All variations thereof are covered within the broad scope of the invention, as for example: a type of support configuration which may be used to support the rotating separator in cantilevered manner overlying a collection pit or reservoir, as for example discussed with general reference to FIG. 1; or a support mechanism suitable for trailable transport; or a support mechanism using rollers or other means that supportively engage the outer peripheral surface of the drum. These and other variations will be envisioned by those skilled in the art.

In the embodiment of FIGS. 2–4, an electric motor 50 and reducer 51 are mounted to the upper support frame member 43a. A drive chain sprocket 52 is driven by the reducer 51. A mating chain sprocket 53 is secured to the hub assembly 38 and a conventional endless roller chain 54 is entrained over the sprockets 52 and 53 to provide the drive motion for rotating the drum assembly 32 in a clockwise direction as viewed in FIG. 3. In the preferred embodiment, the electric motor is a one-half horsepower motor having a reducer that reduces the output RPM of the motor from between 10 to 20 revolutions per minute. The drive sprocket 52 is in the preferred embodiment a 3-inch sprocket and the mating hub sprocket is a 12-inch sprocket, providing an additional 4:1 reduction in speed so that the drum 32 can be adjustably rotated at an operative speed of from about 3 to 6 revolutions per minute. An appropriate chain guard assembly 49 is also provided to overlie the chain and sprocket drive assembly. In a preferred embodiment of the invention, the drum 32 has a 78-inch diameter and is approximately 30 inches wide. It will be understood, however, that the size of the drum is a matter of design choice, and can vary to meet the separation needs of the user.

A plurality of lift paddle members 60 are secured to the inner cylindrical surface of the drum 32 in uniformly spaced manner along the inner circumference of the drum. While the number of such lift paddles can vary, the preferred number is from about 16 to 20 paddles. When secured to the drum, the paddles rotate therewith, as hereinafter described in more detail.

A first preferred configuration of a paddle is illustrated in FIG. 5. Referring thereto, the paddle has a comb-like base portion 61 having a generally solid rear support portion 61a connecting a plurality of forwardly extending teeth members 61b.

The back edge of the rear solid rear support portion 61a of the base 61 is angled downwardly at 61c to define a flange longitudinally extending along such back edge, for adding structural stability to the base portion along its longitudinal length. The solid portion 61a of the base 61 has a pair of mounting holes 61d formed therethrough which are aligned with holes in a plurality of "L" shaped mounting brackets 64 which are bolted or secured by welding or the like to the inner surface of the drum 32. A pair of such mounting brackets 64 are appropriately aligned and secured to the mounting drum, for mounting each of the lift paddles 60. A pair of mounting bolts 62 are entrained through the mounting holes 61d of each paddle and through the corresponding holes of the mounting bracket 64, for securing each of the lift paddles 60 to the drum 32 in removable/replaceable manner.

The opposite ends of the base portion 61 are extended upwardly in gusset-like fashion to form side walls 63, giving the lift paddle 60 a scoop-like configuration. The back edges of the side walls 63 are configured to directly engage the inner surface of the drum cavity such that the inner drum wall operatively forms a back wall of the scoop configuration. The lift paddles 60 are sized to extend in the axial direction virtually entirely across the entire width of the cylindrical drum inner cavity between the end plates 32a and 32b. In the preferred embodiment, the lift paddles 60 are secured to the drum 32 such that the forwardly extending teeth members 61b of the base portion 61 project inwardly and generally toward the center of the drum, but in a manner such that the general plane of the base portion 61 forms an angle of approximately 15 degrees to 20 degrees with a radian of the drum when viewed as in FIG. 3, and advanced in the rotational direction from the radian.

The slot width spacing between the comb-like teeth or tines 61b of the paddle base portion 61 can vary, to accommodate the particular use to which the separator 30 will be put. An approximate range of such spacing widths might be from 1/16 inch to 1/2 inch. Such comb-like extensions might also be formed from steel rods, as for example by 3/8-inch steel rods separated by 3/8-inch spaces, or the like.

The lift paddle members could be constructed using alternate configurations as for example from mesh, porous or screen-like material as illustrated at 60' in FIG. 6. It is anticipated that such mesh-like paddle would also have sidewall extensions 63 to add rigidity, but may not necessarily be required.

In the first embodiment of the separator 30 illustrated in FIGS. 2–6, the slurry material to be processed and the separated materials enter and leave the separator drum assembly respectively by means of the inlet/outlet port 33. Slurry materials are introduced into the cylindrical drum through the inlet/outlet port 33 either by means of a pipe or conduit through which slurry materials flow or are pumped, or by means of an appropriate conveyor assembly such as generally illustrated at 55. Also, a conduit 56 for introducing additional water or liquid to the drum is provided through the inlet/outlet port 33. Solids separated from the slurry by means of the rotating separator drum 32 fall by gravity into a hopper 57 which directs the solids to an appropriate transport device such as a vibrating tray or conveyor 58 which carries the solids to a remote solids depository area, or to a conveyor belt, auger or the like for transport to a remote solids depository area, as previously described with respect to FIG. 1. The hopper 57 and transport mechanism 58 are appropriately mounted to the vertical support members 43*d* of the support frame 43 in cantilevered manner for extension through the inlet/outlet port 33 and across the width of the drum 32, as illustrated in phantom in FIG. 2, to collect solids falling by gravity from the uppermost lift paddles 60 which are positioned in inverted manner as they rotate through the upper arcuate path of rotation defined by the cylindrical drum. The vertical support members 43*d* are vertically adjustable in telescopic manner to provide height adjustment to the hopper and transport mechanisms.

Since animal waste slurries include a sticky mucous-like material which tends to make the slurry stick to adjacent surfaces, it is desirable to initially precharge a sufficient amount of liquid to the inner cavity of the drum 32 by means of the water inlet 56 to assist in the "washing" of such mucous material from the slurry solids. Such washing action causes the solids to move more freely within the slurry and to separate more easily. The slurry to be separated is then introduced to the inner cavity of the drum 32 by the conveyor or input conduit 55, through the inlet/outlet port 33. A combination of slurry to be separated and water is introduced to the inner cavity 35 of the drum 32 until the combined level thereof reaches the lower border of the inlet/outlet port such that additional materials will cause liquids to spill out along and over the collar portion 32*c* of the drum 32 for appropriate collection by a collection pit 13 or other appropriate collection means. Thereafter, waste slurry material can be continuously added to the inner cavity 35 by means of the inlet conduit or conveyor 55 and additional water only need be added occasionally in the event that the slurry concentration gets too heavy, or if the liquid level within the cavity 35 drops below the minimum desired liquid level threshold as established by the inlet/outlet port 33.

To effect the separation process, the motor 50 is energized to cause the drum to rotate through the chain drive assembly at a rotational speed of between 3–6 RPM. As the drum 32 rotates (in the clockwise direction as viewed in FIG. 3) the lift paddles 60 scoop and lift a quantity of solids from the accumulated slurry within the cavity as the paddles traverse through the lower arc portions of their defined circular paths. As the drum continues to rotate, that slurry material retainably scooped by a paddle 60 will be lifted out of the primary reservoir of slurry material held within the cavity, thereby allowing excess liquid contained in the scooped material to flow back through the comb or porous material portions of the paddle 60 and into the underlying pool of slurry material retained within the drum cavity, for reuse in washing the remaining slurry materials in the reservoir. The retained solids are carried in arcuate manner by the lift paddles along the closed rotational path established by the rotating drum toward the top of the drum cavity, corresponding to the apex of the arcuate path traversed by the paddles. As the general plane of the base portion 61 of a paddle begins to tip beyond a "horizontal" position and inclines downwardly toward the comb edge tip thereof, excess liquids trapped by the paddle scoop configuration will first flow out of the lift paddle scoop and back into the drum cavity. As the drum continues to rotate and to further incline the base portion of the paddle at steeper angles toward its comb-like edge, the solids retainably held by the lift paddle will begin to slide under the force of gravity in the radially downward direction along the comb-like paddle surface and toward the distal end thereof, until the solids slide by gravity out of the lift paddle and into the underlying collection hopper 57. The collection hopper 57 directs the captured solids to the transport tray, conveyor, auger or other appropriate transport mechanism 58, which carries the solids to a remote solids collection site 17*a*. The process is continuous, as dictated by the amount of slurry added to the cavity, with the liquids within the cavity being continuously reused for washing successive quantities of introduced slurry. Excess liquids within the drum cavity 35 simply spill in overflow manner out of the inlet/outlet port 33 and back into the underlying collection pit 13 or other appropriate liquids collection means for pumping, collection or other processing. The removed solids can be further processed if desired, as for example by roll press or squeeze box structures, and spread or composted or the like.

A simple yet effective continuous washing separation process is thus performed, with no internally movable parts subject to failure or excessive wear, other than for the lift paddle blades within the rotating drum, which simply rotate with the drum. The only frictional forces applied to the lift paddles are those caused by the sliding action of the slurry and solids against the paddles as the slurry is lifted thereby, and allowed to slide by gravity therefrom.

As previously mentioned, the materials run through this type of rotary separator can be directly processed by the separator as they come from the barn or the yard. Such immediate separation will help to diminish the sand content from the materials and thus virtually eliminate the sand settling problems heretofore commonly occurring in storage pits. The separation apparatus is also usable for eliminating solids from materials that have already been stored in large storage pits or reservoirs for removing solids and fiber from such materials for facilitating pumping of the materials from the storage pits. The "combing" or "forking through" action of the lift paddle members provides positive raking action through the slurry which greatly facilitates removal of fibrous materials such as hay and straw bedding materials therefrom.

A second embodiment of a separator apparatus for separating solids from slurries, is generally illustrated at 70 in FIGS. 7 and 8 as it might appear operatively mounted in suspension overlying a reservoir or storage pit 13. The separator 70 is, as was the first embodiment, a rotary cylindrical drum structure 72 generally symmetrically disposed about a central axis 80. The cylindrical drum 72 extends between an inlet end generally designated at 73 and an oppositely disposed outlet end generally designated at 75. The inlet end 73 of the drum is partially closed by means of an annular end plate 73*a* that flares outwardly at its outer peripheral edge at 73*b* to define a support race. The annular end plate 73*a* also flares outwardly along its inner peripheral edge at 73*c* to form a collar portion that defines the inlet port 74 to the internal cavity 82 of the drum 72. The outlet end 75 of the drum 72 is partially closed by means of an annular end plate 75*a* that flares outwardly at its outer peripheral edge 75*b* to define a second support race for the drum. The annular end plate 75*a* also flares outwardly along its inner peripheral edge at 75*c* to form a collar portion that defines an outlet port 76 from the internal cavity 82 of the drum. The length of the outlet port flange 75*c* (as measured in the axial direction of the drum) is sized slightly longer than that of the support race 75*b* so that liquid 18 leaving the outlet port 76 and flowing over the outlet port flange 75c does not fall upon the support race surface 75b which might cause interference with the operation of the rotary drive support mechanism to be hereinafter described.

The cylindrical drum 72 of the second embodiment is a two-stage separator drum which has its internal cavity 82 divided along its longitudinal length by means of an annular separator or divider 77, which divides the inner cavity 82 into first and second inner cavity chambers 82a and 82b respectively. The first inner cavity chamber 82a defines the first separation stage of the dual separator chamber; and the second inner cavity chamber 82b forms the second stage of the dual separator apparatus. In the preferred embodiment, the height (in the radial direction) of the inlet end plate 73a is greater by several inches than that of the central divider 77. Similarly, the radial height of the central divider 77 is several inches greater than that of the outlet end plate 75a. Such relative height differences enable liquid flow over the central divider 77 from the first stage cavity 82a to the second stage cavity 82b, and subsequent exit overflow of liquid from the second cavity chamber 82b and over the outlet port flange 75c to the underlying collection reservoir 13.

Each of the first and second inner cavity chambers 82a and 82b respectively contains a plurality of spaced lift paddle assemblies 90 generally of the same configuration and mounting orientation as previously described with respect to the lift paddle assemblies 60 of the first embodiment. For clarity, only several of the lift paddle assemblies 90 are illustrated in FIGS. 7 and 8. Those lift paddle assemblies in the first stage of the separator (i.e., in the first inner cavity chamber 82a) are denoted by the numeral 90a, and the lift paddle assemblies mounted in the second stage of the dual separating chamber are denoted by the numeral 90b. The lift paddle assemblies 90 are connected to the inner surface of the drum 72 and operate in the same manner as previously described with respect to the lift paddle assemblies 60 of the first embodiment. It will be understood, however, that alternate mounting techniques are possible and will be readily envisioned by those skilled in the art in light of the foregoing description. In the dual-stage separator, the lift paddles 90a in the first stage of the separator operate to remove the larger and primary fibrous solids from the slurry, and are preferably configured with a relatively wider spacing between the tines of the comb-like ends of the paddle assemblies to provide enhanced "raking" action. Those lift paddle assemblies 90b within the second stage of the dual separator act to remove the finer solids from the slurry retainably held within the second inner cavity chamber 82b, and have a relatively narrower spacing between the comb-like projection tines (or a finer mesh in a screen paddle assembly configuration) of the lift paddle assemblies 90b.

The dual-stage separator drum 72 is illustrated as being rotatably suspended over a collection reservoir 13, as illustrated in FIGS. 7 and 8. It will be understood, however, that other mounting methods may be used. In the preferred embodiment of the dual-stage separator, the diameter of the drum 72 is approximately 8 feet and its axial length is approximately 6 feet, making a cylinder of such size generally impractical for mounting by one end with an axle or spindle assembly as was the case for the first embodiment single-stage separator previously described. The dual-stage cylindrical drum is, therefore, supported for rotation at both its input and output ends. A pair of longitudinally extending suspension frame beams 95a and 95b are mounted to span the open area of the storage pit 13 (as illustrated in FIG. 8), and are disposed in generally parallel manner along and to either side of the separating drum 72. The beams 95 are secured at their respective ends to the foundation walls for the storage pit 13 by means of height adjustable mounting assemblies, generally illustrated at 96, which allow for relative leveling of the suspension beams 95. A pair of cross-brace assemblies, generally indicated at 97a and 97b transversely interconnect the suspension frame beams 95a and 95b adjacent the oppositely disposed inlet and outlet ends of the drum 72 and form mounting platforms for the support drive wheel assemblies of the system.

The drum 72 is mounted for rotation upon four wheel assemblies, generally designated at 98 and 99. The pair of support wheel assemblies designated as 98a and 98b are positioned adjacent the inlet end 73 of the drum 72 and support the inlet end by means of the support race 73b of the drum. The support wheel assemblies designated at 99a and 99b are disposed adjacent the outlet end 75 of the drum 72 and support the outlet end of the drum by direct engagement with the support race 75b of the drum. The pair of support wheel assemblies 98 adjacent the inlet end of the drum are mounted for rotation to the cross-brace assembly 97a; and the pair of support wheel assemblies 99 adjacent the outlet end of the drum are operatively mounted for rotation to the cross-brace member 97b. The support wheel assemblies 98 and 99 have appropriate bearing supports for their axles as generally indicated at 101 and 102 respectively. The four point engagement of the wheels 98 and 99 with the outer support races 73b and 75b of the drum 72 provides uniform rotational support for the drum 72.

Two or more of the support wheel assemblies may be driven by hydraulic motors and appropriate coupling and reduction assemblies (generally indicated at 100 in the figures) to provide a drum rotational speed of about 3–6 RPM. The details of such drive and reduction assemblies are not illustrated in the figures, it being understood that those skilled in the art could readily configure the appropriate such drive motors and speed reduction assemblies to achieve the desired rotational drive properties. For example, the actual drive interfaces could be accomplished by means of sprockets and chains, belts, gear boxes or the like. Also, the relative sizing of the drive motors, and the reducing assemblies will depend in part upon the relative dimensions of the drive wheels 98 and 99 and the circumferences of the support races 73b and 75b. In the preferred embodiment, the drive wheel assemblies 98 and 99 have wheels with 8-inch diameters.

The suspension mounting configuration for the rotary drum enables the drum to be suspended over collection pits 13 for gravity feed situations wherein the slurry materials from a barn gutter system or the like can simply flow by gravity into the inlet port 74 of the separator drum 72. Such a connection is indicated in FIG. 8 by the conduit 105 which forms an extension of the gutter system of a barn or building, which would normally empty by gravity flow directly into the storage pit or reservoir 13. The gutter extension conduit 105 is illustrated as projecting into the inlet port 74 of the drum 72 for depositing waste slurry materials into the first stage or cavity 82a of the drum. The gravity flow gutter could have a flow control valve, generally illustrated at 112, for regulating the flow of slurry material from the gutter into the rotary separator 72. A water inlet hose, generally indicated at 106, is also provided for adding liquid to the inner cavity 82. It may also be desirable to provide an extra "flush" line (not illustrated) to the gutter in order to add extra fluid to the slurry material introduced to the drum 72, which gutter flush line could take the place of the water inlet conduit 106. Such details relate more to the adaptation of a particular facility to house a rotary separator apparatus, than to the operational characteristics or principles of operation of the separator itself.

A pair of collection hoppers 108a and 108b are respectively mounted within and across the first and second cavities 82a and 82b of the separator drum 72 for directing solids deposited from the lift paddle assemblies 90a and 90b respectively onto an appropriate transport means 110, which could be a vibrating tray assembly, a conveyor or an auger, for carrying the solids out of the inner cavity of the separator and out to a remote collection area, as generally indicated by the dashed line 17 in FIG. 8. The transport means 110 is appropriately mounted for support in suspended manner through the inlet and outlet ports 74 and 76 respectively of the drum 72 as for example to the crossbrace assembly 97a at the inlet end and to one or more cross-brace assemblies such as ill at the outlet end.

The principle of operation of the dual-stage rotary separator 72 is the same as previously described with respect to the single-stage separator, except that the solids separation operation is performed twice within the chamber 82. Solids from the slurry and water deposited within the first stage and cavity chamber 82a of the separator 72 are lifted and separated therefrom by the lifting paddle assemblies 90a as the drum rotates. The paddles 90a deposit their solids, in manner previously described, into the collection hopper 108a and the underlying transport means 110. Since the first stage of the dual-stage separator is intended to remove the coarse or larger solids from the slurry, the relative spacings of the tines of the comb portions of the lift paddles are larger in the first stage than they are for the lift paddle assemblies 90b in the second stage. As the drum 72 rotates and as additional slurry materials are deposited in the first stage from the gutter extension conduit 105, a certain amount of slurry material will flow over the central divider 77 and into the holding cavity portion of the second stage cavity 82b. The finer toothed lift paddle assemblies 90b will act upon the slurry materials within the second stage to remove finer solids therefrom in the manner previously described, and will deposit such finer solids into the collection hopper 108b and to its underlying transport means 110. That material which flows over the outlet port flange 75c of the separator drum 72 and into the underlying storage reservoir 13 will be substantially free of solids, and will have been twice-separated by the continuous separation process being performed by the rotary separator. As with the first embodiment, the lift paddle assemblies 90 could be configured of screen material, particularly in the second stage of the separator, where the finer solids are being removed from the slurry. In the first stage, it is more preferable to use the comb-like separation paddle assemblies since such paddles tend to act like forks or combs to rake through the slurry materials to engage and entrap larger solids and fibrous materials within the slurry. Also, as with the single-stage separator previously described, since the liquids from the slurries are continuously dropped back into the contained materials within the drum 72, such liquids repeatedly enhance the cleansing (washing) operation of the solids contained within the drum to continuously facilitate solids separation by the lifting paddle assemblies as they pass through the contained slurry.

The stage separation between the plural cavities of the separator need not be configured entirely out of solid materials. An alternative arrangement of the internal stage separation configuration of a dual-stage rotary separator, similar to that illustrated in FIGS. 7 and 8, is diagrammatically portrayed in FIG. 9. Referring thereto, the input end of the drum is the same as previously described with respect to FIG. 8, wherein like parts retain like numerals in FIG. 9, but with a prime designation. The central divider 77 of FIG. 8, however, has been replaced in FIG. 9 with a lower solid portion 120 and an upper screen portion 121. The outlet end 75' is also generally the same for the FIG. 9 configuration as previously described with respect to the FIG. 8 configuration except that the relative height of the end plate 75a' is somewhat less than its previously described counterpart 75a. The FIG. 9 configuration includes an additional, second annular divider partition 122 spaced inwardly from the outlet end plate 75a by "A", which is in the preferred embodiment approximately 3 inches, and is formed entirely of a perforated or screen material. In this embodiment, the lift paddle assemblies 90a' in the first stage lie between the end plates 73a' and the composite first divider formed by the annular bands 120 and 121. The lift paddle assemblies 90b' in the second stage lie between the first composite divider 120, 121 and the second divider 122. The relative heights in the radial direction of the dividers is such that the height "B" of the inlet end plate 73a' is several inches greater than the height of the composite first divider "C" formed by 120 and 121. The relative height "C" of the composite divider 120, 121 is larger by several inches than the height "D" of the screen divider 122, which is in turn several inches greater than the height "E" of the outlet plate 75a'. The height "F" of the upper screen portion 121 of the composite divider 120, 121 is approximately ⅔ that "G" of the lower solid portion 120 of the composite divider. The effect of such relative heights is that the slurry materials entering the first stage will enable liquids to flow through and over the screen portion 121 of the first divider member and into the second stage, and liquid materials can freely flow through the second screen divider 122 and out toward the outlet port 76' of the separator, but the screen 122 will retain the finer solids in the second stage cavity 82b' of the drum for continuous separating action by the rotating lift paddles 90b'. This embodiment permits liquids to flow more freely between the separation chambers, but retards the flow of solids between the chambers. However, due to the relative decreasing heights of the divider sections, when traversing from the inlet port to the outlet port of the drum 72, the general flow of materials through the separating chamber will still be from the inlet port to the outlet port thereof.

Another embodiment of a separator apparatus configured according to the principles of this invention is illustrated at 200 in FIGS. 10–14. The separator is illustrated as a trailable apparatus configured for transport on a support frame assembly, generally illustrated at 202. In the preferred embodiment illustrated, the support frame 202 includes a pair of longitudinally spaced side frame members 202a connected at their front and back ends by a pair of lateral frame members 202b and 202c respectively. The support frame is carried by a pair of wheel/axle assemblies, generally illustrated at 204, connected to the side frame members 200a in a manner well-known in the art. In the preferred embodiment, the wheel axle assembly 204 is detachable, enabling the support frame to be mounted for permanent installation. The support frame assembly further has connected thereto at least two, and preferably four, hydraulic jack leveler assemblies, generally designated at 206, for leveling the frame assembly in a manner well understood by those skilled in the art. For the purposes of simplifying this description the various hydraulic components and circuits needed to complete the hydraulic systems described will not be detailed. It will readily be understood by those skilled in the art how to interconnect the various hydraulic components in an operable manner. In the preferred embodiment illustrated, a towing tongue/hitch member 203 is pivotally secured to the front lateral frame member 202b and pivots out of the way so as to lie generally below the front frame member when the separator system is in operative use. While a trailable support configuration has been illustrated, it will be understood by those skilled in the art, that for applications requiring the separator apparatus to be permanently mounted within a building or structure, the support frame would be appropriately modified for mounting within such structure.

The primary separator drum 210 is rotatably supported on the frame 202 by means of four roller assemblies, generally indicated at 212. The roller assemblies 212 are mounted to the side frame members 202a in longitudinally spaced manner such that a forward pair of the rollers are longitudinally aligned with one another along the frame side members 202a and rotatably engage and support the drum 210 along a first peripheral band 211a and such that a rear pair of the rollers are longitudinally aligned with one another along the frame side members 202a and rotatably engage and support the drum 210 along a second peripheral band 211b. The bands 211 comprise reinforced annular race portions circumferentially extending around the outer periphery of the drum 210. The roller assemblies 212 are, in the preferred embodiment, idler rollers.

The general configuration of the primary separator drum 210 is preferably of one of the types previously described with respect to FIGS. 2–9, and is not detailed in FIGS. 10–14. The separator drum may have either a single or a plurality of separator chambers, as previously described. In the preferred embodiment illustrated, the drum 210 is of a flow through configuration, having an inlet port at its inlet end, generally designated at 216 and an outlet port at its outlet end, generally designated at 218. The slurry to be separated enters the drum 210 through its inlet port 216 by means of an appropriate inlet conduit, generally designated at 220.

As with the cylindrical drum configuration of the second embodiment, the inlet end of the drum is partially closed by means of an annular end plate 217, and the outlet end of the drum is partially closed by means of an annular end plate 219. A plurality of support members 221 extending generally in a radial direction and mounted along the outer surfaces of the annular end plates 217 and 219 and connecting to the outer drum surface, provide additional support for the annular end plates 217 and 219. In the preferred embodiment, the diameter of the drum 210 is approximately eight feet, and the central openings formed through the annular end plates 217 and 219 are approximately five feet in diameter. This configuration leaves a working "depth" of approximately 1.5 feet along the bottom of the internal cavity of the drum 210 for holding slurry introduced into the cavity by means of the inlet conduit 220. In the preferred embodiment, the length of the primary separator drum 210 (as measured in its axial direction) is approximately five feet.

The outer wall of the drum 210 extends in the axial direction beyond the general plane of the annular end plate 219 at the outlet port end of the drum to define a first cylindrical seat ring 222 that is coaxially aligned with the axis of the drum 210. A second cylindrical seat ring 224, generally of the same configuration, size and shape as the first cylindrical seat ring 222 is coaxially aligned with the drum and the first cylindrical seat ring 222 and connected thereto in axially spaced manner by means of a plurality of support extensions 226. In the preferred embodiment, the support extensions 226 are angle iron members having their angled leg portion projecting radially inward. The outer radial surfaces of the first and second cylindrical seat ring members 222 and 224 and the outwardly directed surface portions of the support bars 226 cooperatively support and define the shape of a cylindrical wire mesh screen 230 that is secured thereto. A plurality of external band or strap members 232 circumferentially extend around the screen 230 and further hold it in engagement with and against the cylindrical seat rings 222 and 224 and the support bars 226. In the preferred embodiment, the mesh opening size of the screen 230 is 0.25 inch; however, it will be recognized that such size is a matter of design choice.

The forward edge of the second cylindrical seat ring 224 is secured to an annular cam plate 234 and is coaxially aligned therewith and with the axis of the drum 210. The outer peripheral edge of the cam plate 234 defines a plurality of cam teeth members 234a which have a radial height of approximately 3–4 inches. The entire assembly of the first and second cylindrical seat rings 222 and 224, the interconnecting support bars 226, the annular cam plate 234 and the attached wire mesh screen 230 form a rotating screen filter that rotates as a unit with the primary separator drum 210 about its central axis.

In the preferred embodiment, the axial length of the rotatable screen portion of the assembly is approximately four feet.

A drive sprocket 207 is mounted to the annular end plate 217 around the inlet port 216 thereof at the inlet end of the drum 210. A drive chain 208 is entrained around the sprocket and driven by the output of a hydraulic drive motor 209 which is mounted to the frame 202. The drive motor 209 rotates the entire separator drum 210 and attached screen filter assembly as supported by the roller assemblies 212. In the preferred embodiment, the drive motor 209 rotates the drum/filter assembly preferably in the range of 1 to 4 revolutions per minute.

The drum 210 also has an annular projection 223 extending radially outward from the outer surface of the drum 210 at its outlet end. Opposite surfaces of the projection are engaged by a pair of retention rollers (not illustrated) for maintaining the longitudinal position of the drum/filter relative to the support frame as the drum/filter assembly rotates on the roller assemblies 212 during operation.

An inverted U-shaped support frame 235 has its downwardly projecting legs connected to one of the support frame 202 in a manner soas to support the upper bar portion thereof in cantilevered manner overlying and spaced from the rotatable drum, screen and cam assemblies. An impact cam follower member, generally illustrated at 237 is pivotally connected to the upper crossbar member of the U-shaped frame 235. The impact cam follower member 237 is in the preferred embodiment, of generally U-shaped configuration and constructed of iron rod material, and includes a cam-follow or extension arm 237a that longitudinally projects over the end of the screen filter assembly and engages the cam teeth members 234a of the annular cam plate assembly 234. As the annular cam plate rotates in the clockwise direction as viewed in FIGS. 10 and 13, the cam follower arm 237(a) engages and rides up and along the outer cam surface of a cam tooth, causing the impact cam follower member to rotate about is pivot axis. When the cam follower arm 237(a) reaches the apex of an engaged cam tooth, further rotation of the cam plate will cause the cam follower to drop and provide an impact force to the edge of the annular cam plate, with a force dictated by the weight of the impact cam follower assembly 237. The sharp impact force is transmitted to the screen member 230 near the top of its rotational travel. Such impact force helps to dislodge filtered material carried by the screen, as hereinafter described in more detail.

A liquid collection tray member 240 is disposed below and along the length of the screen member extension for collecting liquids passing through the screen mesh of the rotating filter. A "forward" extension 240a of the collection tray extends beyond the forward edge of the rotating filter screen and collects additional moisture that is extracted from the separated solids by the collector hopper, as is discussed in more detail hereinafter. The extension 240a slopes back toward the primary liquid collection portion of the tray 240. The tray 240 can be configured to have either a portion thereof that slants downwardly toward a sump portion wherein the liquid is collected and pumped, or can include a discharge outlet conduit 241 for carrying the collected liquid to a sump and pump station.

This embodiment of the invention further illustrates an improved collector hopper 250 that serves the multiple functions of: collecting separated solid materials from the primary separator drum 210; collecting filtered materials from the filter screen member 230; and causing the collected materials to longitudinally move along the collector hopper tray to a discharge point that is external of the separator assembly. During this process, the improved collector hopper 250 also extracts and squeezes further liquids from the collected materials, as hereinafter described in more detail.

The improved collector hopper 250 includes a trough member 251. In the preferred embodiment, the trough member 251 extends from a first end adjacent the inlet end of the drum 210, through the inlet port 216, through the rotating drum 210, through its outlet port 218, through the length of the rotating screen filter portion 230, and through its outlet port 231, to a second, discharge end. In the preferred embodiment, the trough is constructed of stainless steel material; however, it could be made from any appropriate material, including for example, a steel material with a plastic type of coating to enhance sliding of material therealong and to resist abrasion. The elongate trough 251 has a generally planar bottom surface 253, the longitudinal edges of which are integrally connected to oppositely disposed upwardly directed side-wall members 254 that terminate at their uppermost ends at inwardly directed lip portions 254(a). In cross-section, the side-wall members 254 form an obtuse included angle of approximately 120° with the general plane of the floor 253. In the preferred embodiment, the width of the trough 251, from side-wall to side-wall is approximately three feet, its length is approximately 16 feet, and the height from the floor to the top of the side-wall portions is approximately six inches. In the preferred embodiment, the side-walls are substantially formed of screen material having approximately a ⅛ inch mesh opening size. The length of the mesh extends from the end of the trough adjacent the inlet port of the drum 210 and to slightly beyond the outlet port 231 of the screen filter portion of the rotating assembly, generally coextensive with the length of the forward extension 240a of the liquid collection tray 240. In the preferred embodiment, the trough 251 is mounted at an incline or slope of approximately one foot over the 16 foot length of the trough, and inclines downwardly from its end adjacent the inlet port 216 of the drum 210 and toward its discharge end, such that material carried by the trough progresses down the length of the trough as urged by the incline and its motion, as hereinafter described.

In the preferred embodiment, the trough 251 is mounted for longitudinal reciprocating rotation about an axis longitudinally running just below the trough floor 253, such that the trough rotates from side to side by approximately 45–50° from the horizontal with each half rotation. An axle assembly 260 is mounted to and below the bottom of the trough floor 253. The axle is journaled for rotation through a pair of longitudinally spaced bearings 262 for providing the rotational reciprocating motion for the trough. The bearings 262 are mounted by means of support standards 263 connected to the underlying frame assembly 202. The support standards mount first bearing just outside of the roller drum 210 adjacent the inlet port 216 thereof, and a second bearing outside of the outlet port 231 of the rotating screen filter portion of the assembly. The bearings 262 are protected by the trough floor 253 from exposure to the slurry and/or material deposited on and collected by the trough 252.

An angled end plate 264 is mounted to the first end of the trough 251 adjacent but external of the inlet port 216 of the drum 210. One end of a drive arm 265 is pivotally connected to the end plate 264 adjacent its apex. The other end of the drive arm 265 is connected for reciprocal motion to an output drive member (not illustrated) of a hydraulic motor 266. The reciprocal motion provided by the drive arm 265 causes rotation of the trough 252 about its support axle and bearing assemblies between the opposed 45–50° angles, (i.e. a total cyclical traverse of from 90° to 100°) on a two second cycle time (i.e. 30 cycles per minute). The reciprocating trough assembly acts as a shuffle stroke conveyor to move materials carried thereby toward the discharge end of the chute. A counterbalance 255 is mounted to the lower surface of the trough floor 253 to help stabilize the reciprocatory motion of the trough.

A plurality of high pressure nozzles are mounted external of the outer surface of the rotating screen 230 and are arranged to provide a fine spray of water at the outer surface of the screen. The nozzles are aligned to spray the screen at about the 9:00 o'clock position (when viewing the discharge end as in FIG. 13). The nozzles are configured to spray at about an 80 psi pressure and at a rate of approximately two gallons per minute. The spray reopens and loosens any materials clogged in the screen mesh 230.

In operation, the drive motor 209 rotates the entire drum and attached filter screen assembly upon the roller support assemblies 212. Slurry is introduced into the primary separation chamber 210 by means of the inlet conduit 220 or by other appropriate inlet means. Solids are removed from the slurry by the rotating paddles in the manner previously discussed, and are deposited by gravity onto the underlying trough 251. Liquid from the slurry spills out from the outlet port 218 of the drum 210 at a rate (in the preferred embodiment) that would provide a three or four inch level liquid on the filter screen section if the screen were solid. The liquid emitted from the primary separator drum still contains a measure of fine fibers, which are filtered out by the rotating screen 230. The filtered liquid passing through the screen mesh is collected by the underlying liquid collection tray 240. The finer fibrous material entrapped on the screen mesh 230 rotates upwardly with the screen to approximately the 12:00 o'clock position, wherein it either falls on its own accord via gravity or is disengaged from the screen and falls onto the underlying trough 252 as the impact cam follower member 237 taps the annular cam plate as an engaged cam rotates past the impact cam follower member. The solid materials collected by the trough move down the length of the trough toward its discharge end as the trough is reciprocated by the hydraulic motor 266. In the preferred embodiment, the particulate material on the trough moves longitudinally down the trough approximately three to four inches each time the trough rotates through a half cycle.

As the collected material slides toward and engages one of the side-walls of the trough assembly, additional liquid material is squeezed out from the material on the trough and passes through the screened side-wall portions of the trough, further drying the particulate material. Typically, free moisture on the trough tends to run sideways faster than the solids fiber and sand carried by the trough, and therefore reaches the screen on the sides of the trough before the particulate matter as the trough reciprocates. The liquid passing through the primary screen 230 as well as that passing through the side-wall members 254 of the trough 251 is collected by the underlying collection tray 240 which either directs liquids to a point of discharge of the tray or to a sump and storage area where it can be pumped. A portion of the collected liquid is redirected back into the primary separator drum 210 in order to keep the moisture content within the separator drum high enough (typically above 90%) to facilitate the separation process as previously discussed. It has been found that from 20–40% recirculation of the collected, filtered liquid is preferred in order to keep the moisture content of the primary separator drum in the proper range. Apparatus constructed according to the above-described preferred embodiment has been demonstrated to process incoming manure slurry at a rate of 1500 gallons per hour.

While the present invention has been described with respect to its application as illustrated in several preferred embodiments thereof, it will be understood that the number of variations of the embodiment and its applications for use in varied applications are limited only by the imagination of those skilled in the art. Further, while single- and dual-stage separators have been illustrated, those skilled in the art could readily configure separators having any number of separation stages. Also, while a cylindrical drum type of separator has been illustrated and described with respect to the preferred embodiments of the invention, the invention is not to be limited by such cylindrical shape or configuration or to the particular techniques illustrated for supporting and rotatably driving the separation chambers. These and other modifications of the invention will become apparent to those skilled in the art in light of the foregoing description. This description is intended to provide specific examples of embodiments which clearly distinguish and disclose the present invention over the known art. Accordingly, the invention is not limited to the described embodiments, or to the use of any specific components, configurations or materials described herein. All alternative modifications and variations of the present invention which fall within the broad scope of the appended claims are covered.

What is claimed is:

1. A separator apparatus for separating solids from a liquid/solid slurry, comprising:
   (a) a container having a solid outer wall portion defining a first inner cavity suitable for retainably holding a predetermined volume of slurry and a porous outer wall portion defining a second inner cavity contiguous with said first inner cavity; said porous outer wall being configured to filter fine solids from liquids carrying fine solids;
   (b) a support connected to said container for rotatably supporting said container for rotation about an axis;
   (c) at least one partially porous lift paddle mounted to said container within said first inner cavity and rotatable with said container along a closed arcuate path, said lift paddle being arranged and configured to engage and lift solids from the volume of slurry within said first inner cavity as said container rotates about said axis in a first direction;
   (d) a partition separating said first and said second inner cavities, said partition being sized and configured to enable liquid with fine solids to pass from said slurry into said second inner cavity as new slurry is added to the volume of slurry within said first inner cavity;
   (e) a collector extending into said first and said second inner cavities and disposed to at least partially underlie said lift paddle as it rotates in said first direction toward an apex of said arcuate path and to underlie an upper portion of said porous wall as it rotates in said first direction; and
   (f) a drive connected to said container for rotating said container about said axis in said first direction; whereby said lift paddle lifts and deposits coarse solids from said slurry onto said collector and whereby said porous outer wall removes and deposits fine solids from said slurry onto said collector.

2. The apparatus as recited in claim 1, further including a liquid collector mounted below said container and underlying said porous outer wall; whereby filtered liquids passing through said porous outer wall are collected by said liquid collector.

3. The apparatus of claim 2, further including a pump connected with said liquid collector, to pump liquids collected by said liquid collector.

4. The apparatus as recited in claim 3, further including a conduit connecting an outlet of said pump with said first inner cavity of the container for pumping at least a portion of the liquid collected by said liquid collector into said first inner cavity.

5. The apparatus as recited in claim 1, further including an impactor apparatus engagable with the container for providing periodic impact pulses to said porous outer wall, to dislodge fine solids carried thereby.

6. The apparatus as recited in claim 5, wherein said impactor apparatus is mounted adjacent a top portion of said porous wall, such that said fine solids are dislodged from said porous wall adjacent an uppermost arcuate travel position of said wall.

7. The apparatus as recited in claim 5, wherein said impactor apparatus comprises a passive cam-follower member mounted to engage said container, and which moves to provide said impact pulses in response to rotational movement of said container.

8. The apparatus as recited in claim 1, further including at least one liquid spray nozzle mounted adjacent said porous wall on a descending portion thereof as the container rotates; and a pressurized source of liquid connected to said nozzle for selectively providing a spray through said nozzle; whereby said spray dislodges fine solids from said porous wall and cleans the pores of said porous wall as the container rotates.

9. The apparatus as recited in claim 1, further including levelers connected to said support for selectively leveling said support.

10. The apparatus as recited in claim 1, wherein said support includes a plurality of rollers mounted to engage and support the container as it rotates.

11. The apparatus as recited in claim 1, further including an axle and wheel assembly mounted to said support, for moving said separator apparatus over a support surface.

12. The apparatus as recited in claim 11, further including a trailer hitch arm pivotally mounted to said support apparatus, in a manner such that said hitch arm can be selectively pivoted into and out of alignment with said support apparatus.

13. The apparatus as recited in claim 1, wherein said collector further comprises:
   (a) an elongate tray longitudinally extending through said container, from a first end to a discharge end;
   (b) bearing supports connected to said support for pivotally supporting said tray about an axis longitudinally underlying said tray, and downwardly inclined from said first end to said discharge end;
   (c) a reciprocator drive connected to said tray for reciprocating said tray between first and second arcuate positions about said longitudinal axis; whereby solids carried by said tray progressively longitudinally move toward said discharge end as said tray reciprocates.

14. The apparatus as recited in claim 13, wherein said first and said second arcuate positions comprise less than 50 arcuate degrees from a horizontal tray position.

15. The apparatus as recited in claim 14, wherein said first and said second arcuate positions comprise from between 40 to 50 arcuate degrees from a horizontal position.

16. The apparatus as recited in claim 13 wherein said reciprocator drive reciprocates said tray at a cycle frequency of between about 20–30 cycles per minute.

17. The apparatus as recited in claim 13 wherein said elongate tray includes a bottom panel longitudinally extending from said first end to said discharge end, and oppositely disposed side walls continuously extending upward from said bottom panel.

18. The apparatus as recited in claim 17, wherein at least a portion of said side walls are porous, permitting liquid to pass therethrough.

19. The apparatus as recited in claim 13, wherein said side walls define an obtuse included angle with the bottom panel from 90°–120°.

20. The apparatus as recited in claim 1, wherein said collector comprises:
   (a) an elongate bottom panel extending from a first end to a discharge end;
   (b) oppositely disposed side walls continuously extending upward from said bottom panel;
   (c) as least two pivot bearings longitudinally spaced along an axis disposed beneath the bottom panel for pivotally supporting said bottom panel for reciprocal rotational motion about said axis;
   (d) supports for said pivot bearings configured to support said reciprocal conveyor above the ground in a manner such that said first end is disposed relatively higher than said discharge end; and
   (e) a reciprocal drive connected to said conveyor for reciprocally moving said bottom panel and side walls between first and second arcuate positions about said longitudinal axis; whereby materials carried by said tray progressively longitudinally move along said bottom panel and toward said discharge end as the conveyor reciprocates.

21. The apparatus as recited in claim 20 wherein said first and said second arcuate positions comprise less than 50 arcuate degrees from a horizontal bottom panel position.

22. The apparatus as recited in claim 21, wherein said first and said second arcuate positions are between about 40–50 arcuate degrees from the horizontal tray position.

23. The apparatus as recited in claim 20, wherein said reciprocal drive reciprocates said tray at a cycle frequency of between about 20–30 cycles per minute.

24. The apparatus as recited in claim 20, wherein said side walls respectively define included obtuse angles with the bottom panel from between 90°–120°.

25. The apparatus as recited in claim 20, wherein at least a portion of said side walls are porous, permitting liquids to pass therethrough, while retaining solid materials larger than the pore size of the porous walls.

* * * * *